(12) United States Patent
Alfarhan et al.

(10) Patent No.: US 12,273,923 B2
(45) Date of Patent: Apr. 8, 2025

(54) METHODS, APPARATUS AND SYSTEMS FOR SYSTEM ACCESS IN UNLICENSED SPECTRUM

(71) Applicant: InterDigital Patent Holdings, Inc., Wilmington, DE (US)

(72) Inventors: Faris Alfarhan, Montreal (CA); J. Patrick Tooher, Montreal (CA); Ghyslain Pelletier, Montreal (CA); Paul Marinier, Brossard (CA); Aata El Hamss, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 440 days.

(21) Appl. No.: 17/252,418

(22) PCT Filed: Jun. 10, 2019

(86) PCT No.: PCT/US2019/036313
§ 371 (c)(1),
(2) Date: Dec. 15, 2020

(87) PCT Pub. No.: WO2019/245779
PCT Pub. Date: Dec. 26, 2019

(65) Prior Publication Data
US 2021/0274555 A1    Sep. 2, 2021

Related U.S. Application Data

(60) Provisional application No. 62/735,446, filed on Sep. 24, 2018, provisional application No. 62/715,315, (Continued)

(51) Int. Cl.
*H04W 74/0833* (2024.01)
*H04W 72/23* (2023.01)
*H04W 74/0808* (2024.01)

(52) U.S. Cl.
CPC ....... *H04W 74/0833* (2013.01); *H04W 72/23* (2023.01); *H04W 74/0808* (2013.01)

(58) Field of Classification Search
CPC ............. H04W 74/0833; H04W 72/23; H04W 74/0808
See application file for complete search history.

(56) References Cited

U.S. PATENT DOCUMENTS 10,200,904 B2    2/2019    Zhang et al.
11,159,653 B2    10/2021   Basu et al.
(Continued)

FOREIGN PATENT DOCUMENTS

CN    106304092 A    1/2017
CN    107079494 A    8/2017
(Continued)

OTHER PUBLICATIONS

Interdigital, "Random access in NR-Unlicensed", 3GPP Tdoc R2-1909603, 3GPP RAN WG2 Meeting #107, Prague, Czech Republic, Aug. 26-30, 2019, 4 pages.
(Continued)

*Primary Examiner* — Siren Wei
(74) *Attorney, Agent, or Firm* — Majid Albassam

(57) ABSTRACT

Method, apparatus, and systems are disclosed. In one representative embodiment, a method may be implemented by a wireless transmit/receive unit (WTRU) using a channel. The method may include receiving, by the WTRU in a downlink message, a channel transmission trigger (CTT) and selecting, by the WTRU, a type of a Listen Before Talk (LBT) configuration to be performed based on the received CTT. The method may further include determining, by the WTRU in accordance with the type of LBT configuration selected, whether the channel is available for transmission
(Continued)

and transmitting data or control information on the channel, on condition that the channel is available for transmission.

10 Claims, 15 Drawing Sheets

Related U.S. Application Data filed on Aug. 7, 2018, provisional application No. 62/686,943, filed on Jun. 19, 2018.

(56) References Cited

U.S. PATENT DOCUMENTS

| | | | |
|---|---|---|---|
| 11,956,822 | B2 | 4/2024 | Thangaraj et al. |
| 2015/0334736 | A1 | 11/2015 | Chandra et al. |
| 2016/0100433 | A1 | 4/2016 | Vajapeyam et al. |
| 2016/0381589 | A1 | 12/2016 | Zhang et al. |
| 2017/0111921 | A1 | 4/2017 | Fan et al. |
| 2017/0231005 | A1 | 8/2017 | Babaei et al. |
| 2017/0318607 | A1 | 11/2017 | Tiirola et al. |
| 2018/0007575 | A1 | 1/2018 | Singhal et al. |
| 2018/0020478 | A1* | 1/2018 | Derham ............ H04W 74/0808 |
| 2018/0035311 | A1* | 2/2018 | Yang ..................... H04W 16/14 |
| 2018/0042048 | A1* | 2/2018 | Hugl ..................... H04W 16/14 |
| 2018/0048498 | A1 | 2/2018 | Stern-Berkowitz et al. |
| 2018/0176961 | A1 | 6/2018 | Babaei et al. |
| 2019/0200379 | A1* | 6/2019 | Wang ................. H04W 72/0446 |
| 2019/0215217 | A1 | 7/2019 | Kim et al. |
| 2019/0230706 | A1* | 7/2019 | Li ........................ H04B 7/0695 |
| 2019/0313449 | A1* | 10/2019 | Tsai ................... H04W 72/1268 |
| 2019/0349815 | A1* | 11/2019 | Tiirola .................. H04W 72/12 |
| 2019/0387546 | A1* | 12/2019 | Li ..................... H04L 27/26132 |
| 2020/0037359 | A1* | 1/2020 | Wang ................... H04W 72/23 |
| 2020/0260303 | A1 | 8/2020 | Chen et al. |
| 2020/0344819 | A1 | 10/2020 | Myung et al. |
| 2020/0374923 | A1 | 11/2020 | Cheng et al. |
| 2021/0058964 | A1* | 2/2021 | Hooli .................. H04W 74/002 |
| 2021/0076240 | A1 | 3/2021 | Koziol et al. |

FOREIGN PATENT DOCUMENTS

| | | |
|---|---|---|
| CN | 107431591 A | 12/2017 |
| CN | 107980211 A | 5/2018 |
| EP | 2916581 A1 | 9/2015 |
| EP | 3252971 A1 | 12/2017 |
| RU | 2541877 C2 | 2/2015 |
| WO | WO 2016054584 A2 | 4/2016 |
| WO | WO 2017130771 A1 | 8/2017 |
| WO | WO 2018040818 A1 | 3/2018 |
| WO | WO 2018062841 A1 | 4/2018 |
| WO | WO 2018085145 A1 | 5/2018 |
| WO | WO 2019050789 A1 | 3/2019 |

OTHER PUBLICATIONS

Interdigital, Inc., "Initial Access and Mobility Procedures in NR-U", 3GPP Tdoc R1-1912697, 3GPP TSG RAN WG1 Meeting #99, Reno, U.S.A., Nov. 18-22, 2019, 5 pages.
Interdigital, Inc., "Initial Access and Mobility Procedures in NR-U," 3GPP TSG RAN WG1 Meeting #94bis, R1-1811205, Chengdu, China (Oct. 8-12, 2018), 11 pages.
Interdigital Inc., "Design aspects of NR-U uplink signals and channels", 3GPP Tdoc R1-1811203, 3GPP TSG RAN WG1 Meeting #94bis, Chengdu, China, Oct. 8-12, 2018, 12 pages.
Interdigital, Inc., "Initial Access and Mobility Procedures in NR-U", 3GPP Tdoc R1-1910940, 3GPP TSG RAN WG1 Meeting #98bis, Chongqing, China, Oct. 14-20, 2019, 6 pages.
Interdigital Inc., "Random access in NR-Unlicensed", 3GPP Tdoc R2-1809613, 3GPP TSG-RAN WG2 Meeting NR AH 1807, Montreal, Canada, Jul. 2-6, 2018, 5 pages.
RAN4, "LS on BWP switching delay", 3GPP Tdoc R1-1803602, 3GPP TSG RAN WG1 Meeting #92bis, Sanya, China, Apr. 16-20, 2018, 2 pages.
Interdigital Inc., "Initial Access and Mobility Procedures in NR-U", 3GPP Tdoc R1-1902588, 3GPP TSG RAN WG1 Meeting #96, Athens, Greece, Feb. 25 -Mar. 1, 2019, 8 pages.
Interdigital, "SR in NR-U", 3GPP Tdoc R2-1901457, 3GPP TSG-RAN WG2 Meeting # 105, Athens, Greece, Feb. 25-Mar. 1, 2019, 4 pages.
Interdigital, "Random access in NR-Unlicensed", 3GPP Tdoc R2-1816776, Revision of R2-1814007, 3GPP TSG-RAN WG2 Meeting #104, Spokane, U.S.A, Nov. 12-16, 2018, 4 pages.
"3rd Generation Partnership Project; Technical Specification Group Radio Access Network NR; Radio Resource Control (RRC) protocol specification; (Release 15)," 3GPP TS 38.331 V15.0.0, Dec. 2017, 188 pages.
Interdigital, "Random access in NR-Unlicensed", 3GPP Tdoc R2-1906402, Revision of R2-1903554, 3GPP TSG- RAN WG2 Meeting #106, Reno, USA, May 13-17, 2019, 5 pages.
"3rd Generation Partnership Project; Technical Specification Group Radio Access Network; NR; Medium Access Control (MAC) protocol specification; (Release 15)," 3GPP TS 38.321 V15.0.0 (Dec. 2017), 55 pages.
Interdigital, Inc.,Initial Access and Mobility Procedures in NR-U, 3GPP R1-1900787; 3GPP TSG RAN WG1 Ad-hoc Meeting 1901; Taipei, Taiwan, Jan. 21-25, 2019, 9 pages.
Interdigital, "Random access in NR-Unlicensed", 3GPP Tdco R2-1901456, Revision of R2-1816776, 3GPP TSG-RAN WG2 Meeting #105, Athens, Greece, Feb. 25-Mar. 1, 2019, 4 pages.
Interdigital, Inc., "Initial Access and Mobility Procedures in NR-U", 3GPP R1-1906763, 3GPP TSG RAN WG1 Meeting #97, Reno, USA, May 13-17, 2019, 4 pages.
Interdigital, "Random access in NR-Unlicensed", 3GPP Tdoc R2-1811458, Resubmission of R2-1809613, 3GPP TSG-RAN WG2 Meeting # 103, Gothenburg, Sweden, Aug. 20-24, 2018, 5 pages.
Interdigital Inc., "Design aspects of NR-U uplink signals and channels", 3GPP Tdoc R1-1813219, 3GPP TSG RAN WG1 Meeting #95, Spokane, USA, Nov. 12-16, 2018, 14 pages.
Interdigital Inc., "On NR-U Frame Structure", 3GPP Tdoc R1-1809086, 3GPP TSG RAN WG1 Meeting #94, Gothenburg, Sweden, Aug. 20-24, 2018, 5 pages.
English Language Abstract, Korean Publication No. WO2018040818, Mar. 8, 2018, 1 page.
Interdigital Inc., "BWP operation in unlicensed spectrum", 3GPP Tdoc R1-1806968, 3GPP RAN WG1 Meeting #93, Busan, Korea, May 21-25, 2018, 4 pages.
"3rd Generation Partnership Project; Technical Specification Group Radio Access Network; Evolved Universal Terrestrial Radio Access (E-UTRA)—Physical layer procedures; (Release 15)", 3GPP TS 36.213 V15.0.0, Dec. 2017, 493 pages.
Interdigital, et al., "Text Proposal for Scheduling Request in NR-U", 3GPP Tdoc R2-1816775, 3GPP TSG-RAN WG2 Meeting #104, Spokane, U.S.A, Nov. 12-16, 2018, 2 pages.
Interdigital, "SR in NR-U", 3GPP Tdoc R2-1811459, 3GPP TSG-RAN WG2 Meeting # 103, Gothenburg, Sweden, Aug. 20-24, 2018, 5 pages.
Interdigital Inc., "Initial Access and Mobility Procedures in NR-U", 3GPP Tdoc R1-1904854, 3GPP TSG RAN WG1 #96bis, Xi'an, China, Apr. 8-12, 2019, 7 pages.
Qualcomm Incorporated, "Study on NR-based Access to Unlicensed Spectrum", 3GPP TSG RAN Meeting #77, 3GPP Tdoc RP-172021, Sapporo, Japan, Sep. 11, 2017, 5 pages.
"3rd Generation Partnership Project; Technical Specification Group Radio Access Network; Study on Licensed-Assisted Access to Unlicensed Spectrum; (Release 13)", 3GPP TR 36.889 V13.0.0, Jun. 2015, 285 pages.
Interdigital, "Random access in NR-Unlicensed", 3GPP Tdoc R2-181407, Revision of R2-1811458, 3GPP TSG-RAN WG2 Meeting # 103bis, Chengdu, China, Oct. 8-12, 2018, 5 pages.
Interdigital, "Random access in NR-Unlicensed", 3GPP Tdoc R2-1912888, Revision of R2-1909603, 3GPP RAN WG2 Meeting #107bis, Chongqing, China, Oct. 14-18, 2019, 2 pages.
Interdigital, "Random access in NR-Unlicensed", 3GPP Tdoc R2-1903554, Revision of R2-1901456, 3GPP TSG-RAN WG2 Meeting #105bis, Xi'An, China, Apr. 8-12, 2019, 4 pages.

(56) References Cited

OTHER PUBLICATIONS

Interdigital, Inc., "Initial Access and Mobility Procedures in NR-U", 3GPP Tdoc R1-1909011, 3GPP TSG RAN WG1 Meeting #98, Prague, CZ, Aug. 26-30, 2019, 5 pages.

3GPP TR 38.889: "Study on NR-based access to access to unlicensed spectrum", v16.0.0, 3rd Generation Partnership Project; Technical Specification Group Radio Access Network; Study on NR-based access to unlicensed spectrum (Release 16) Dec. 2018, 5 pages.

3GPP TSG RAN WG1 Ad-hoc Meeting 1901, R1-1900787, Initial Access and Mobility Procedures in NR-U, Taipei, Taiwan, Jan. 21-25, 2019, 10 pages.

English Language Abstract, Chinese Publication No. 106304092 A, published Jan. 4, 2017.

"On Initial Access for NR Unlicensed Spectrum," 3GPP TSG RAN WG1 Meeting #93, R1-1807037, Busan, South Korea (May 21-25, 2018).

\* cited by examiner

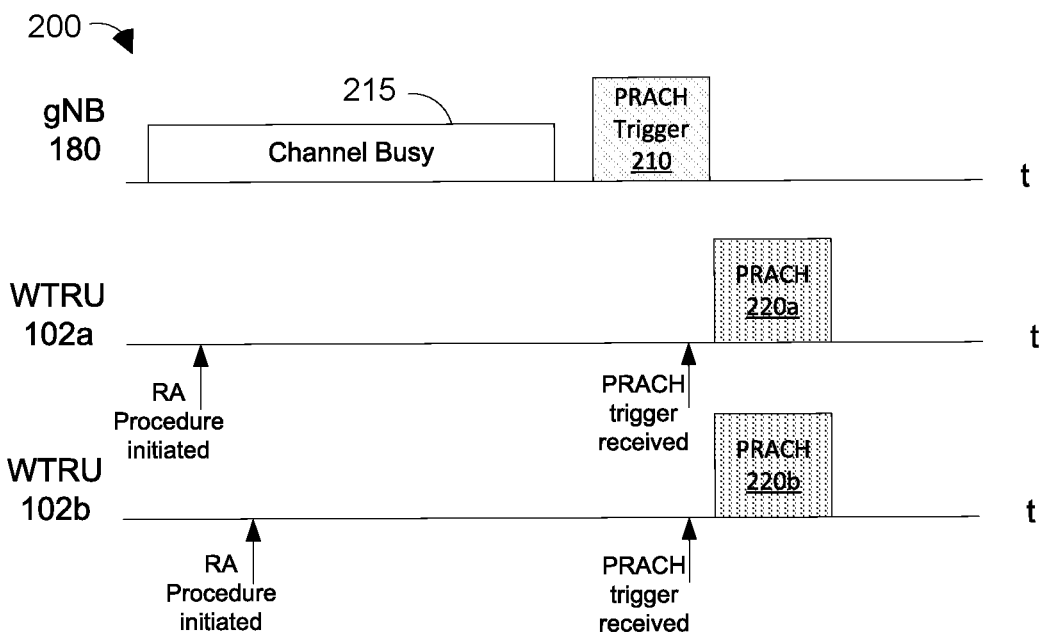
FIG. 2: Example of a PRACH transmission upon receiving a trigger signal
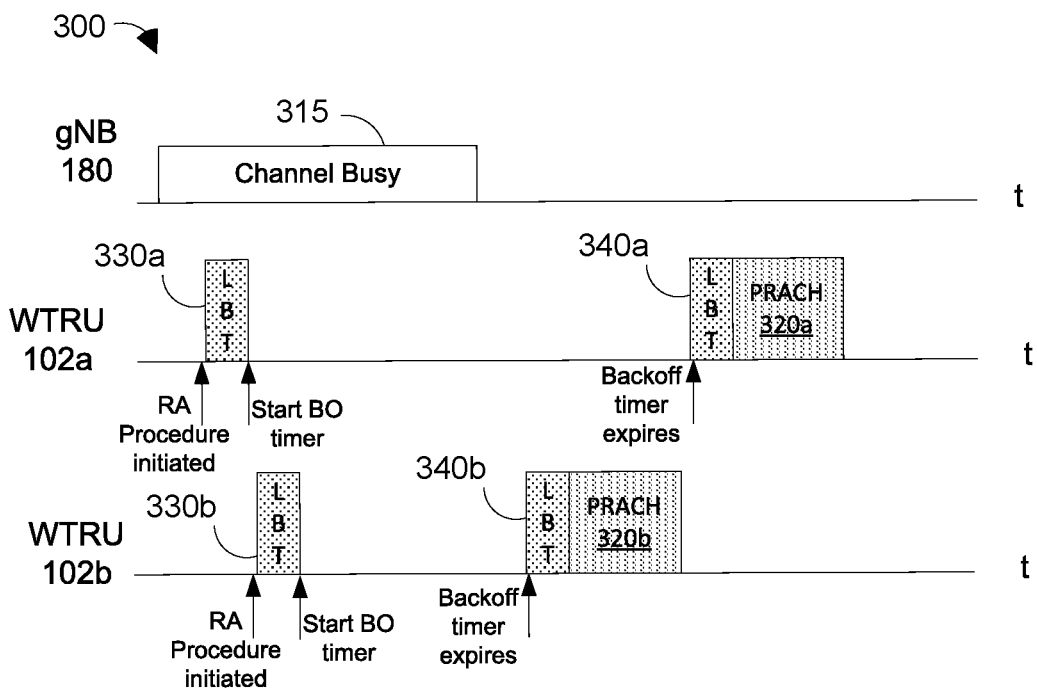
FIG. 3: Example of random backoff applied by the UE after LBT failure

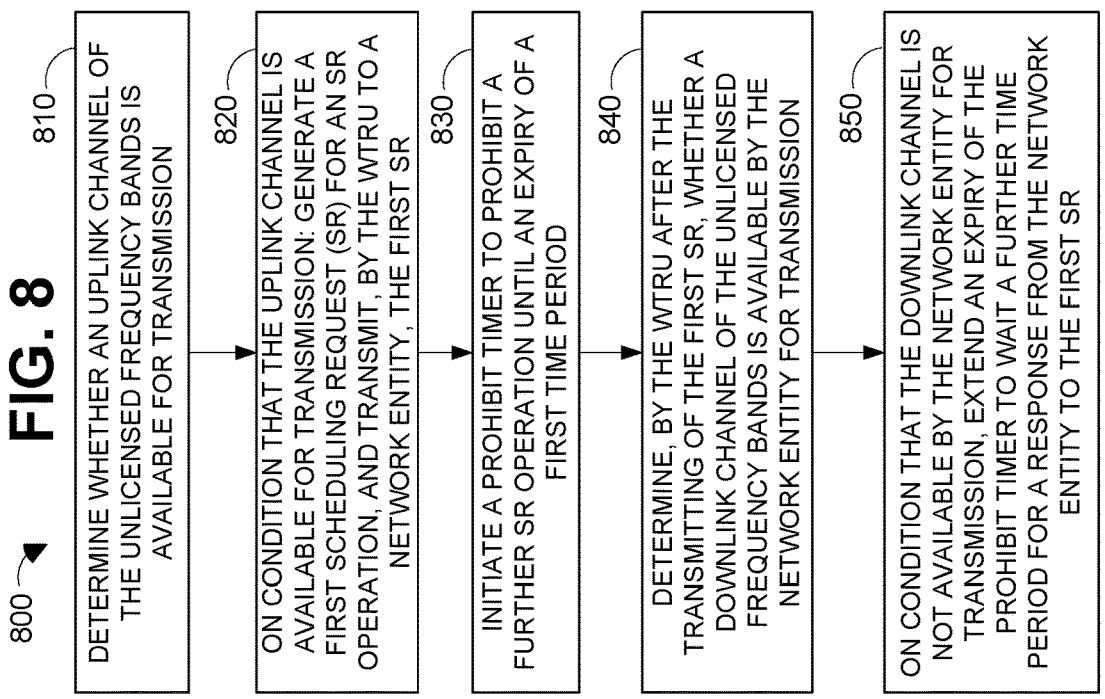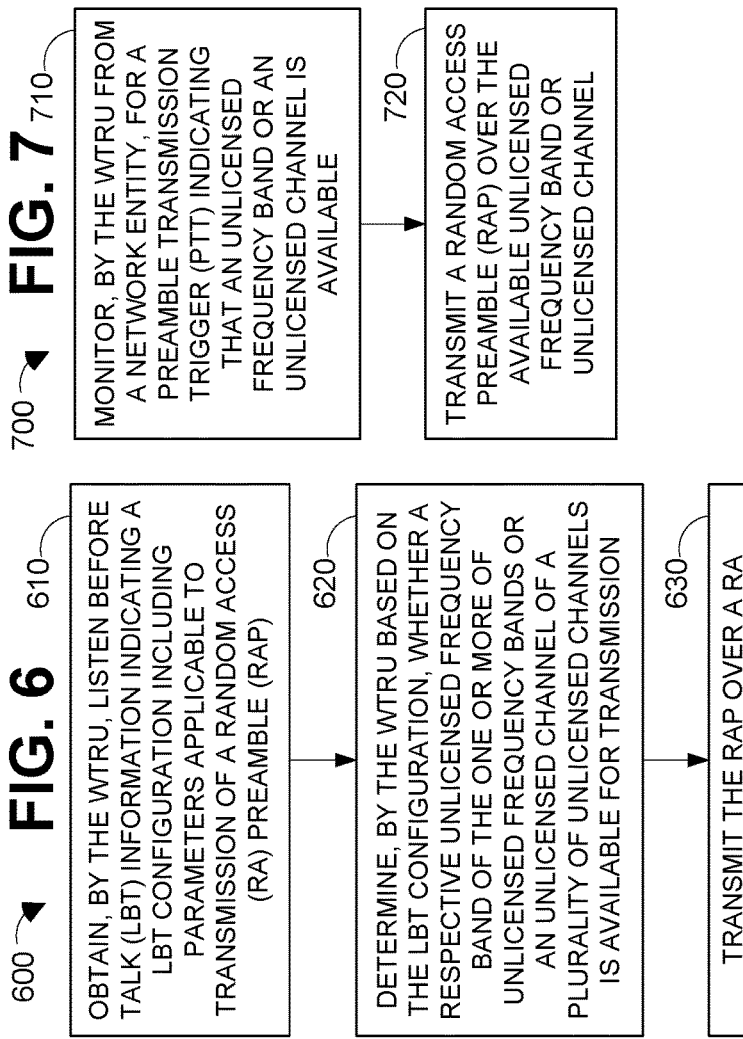

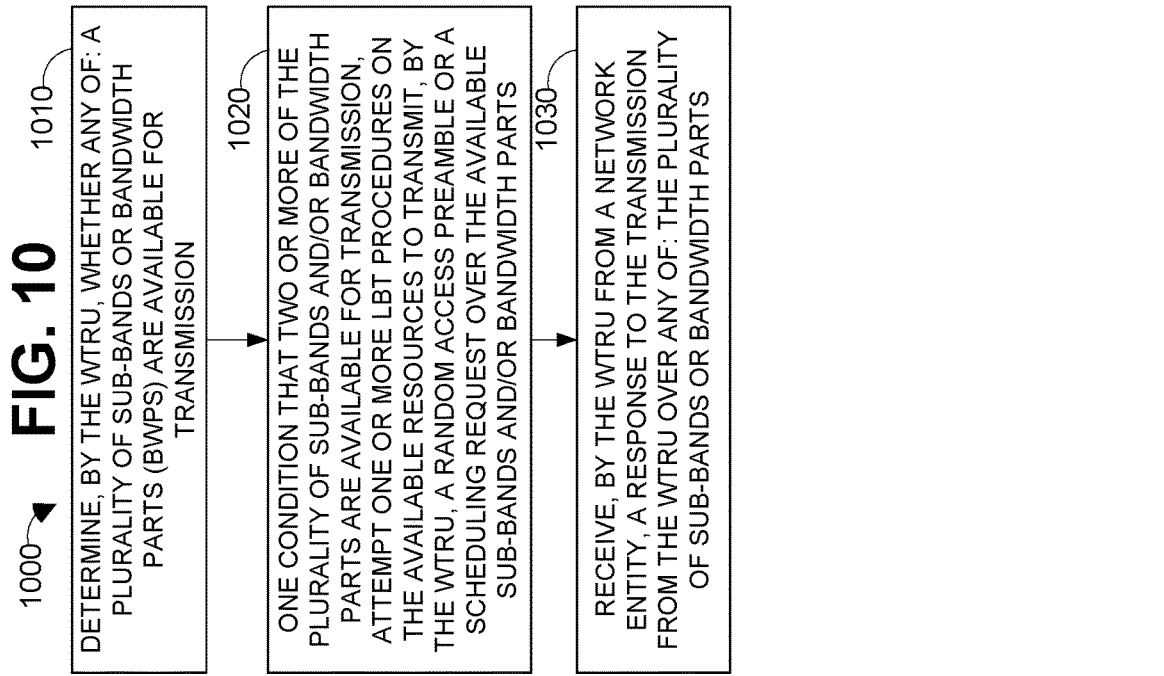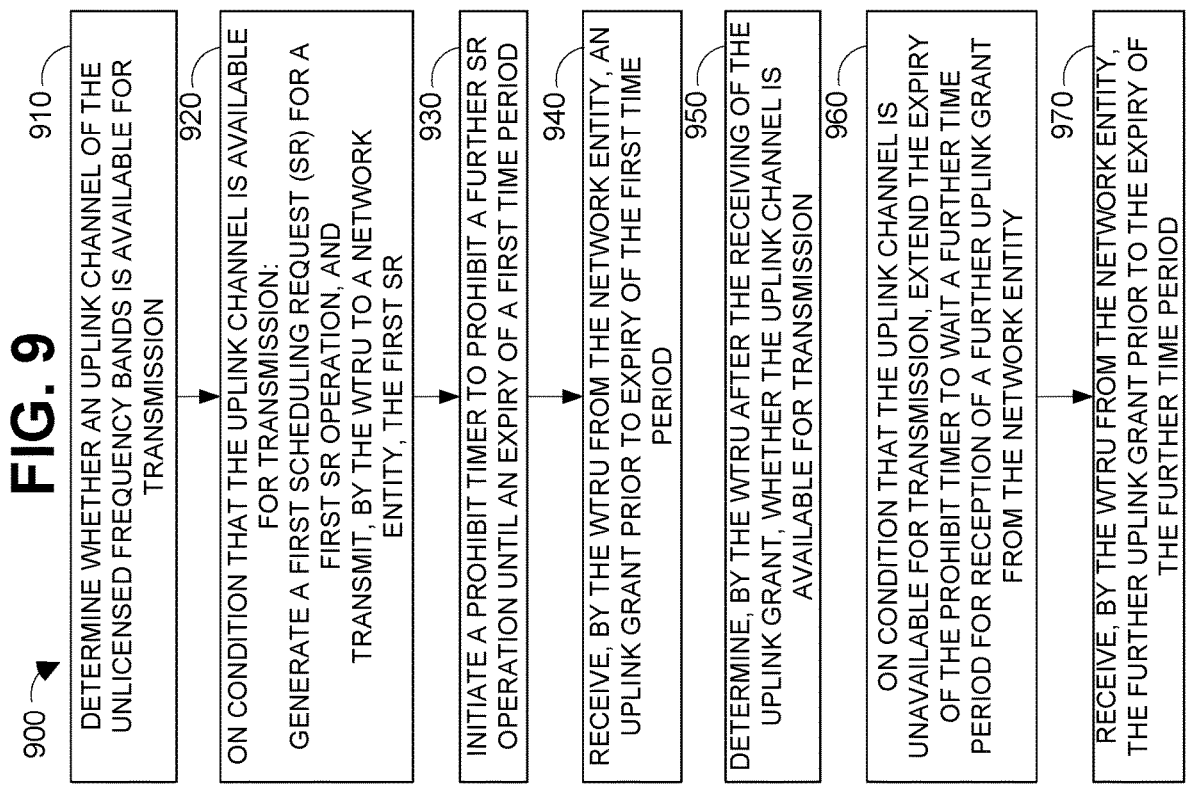

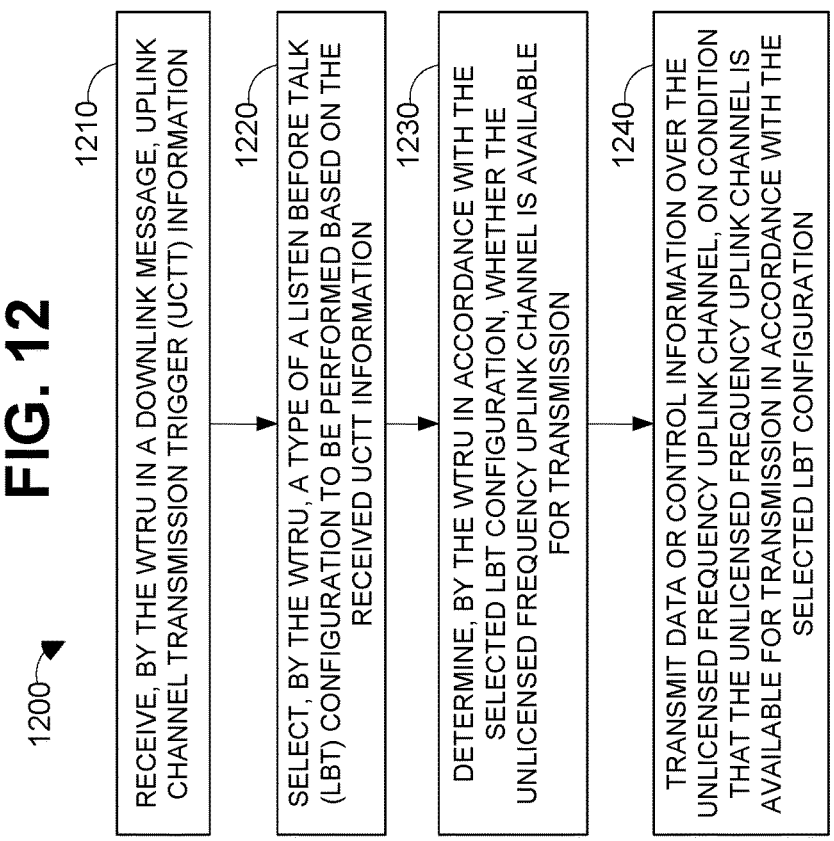
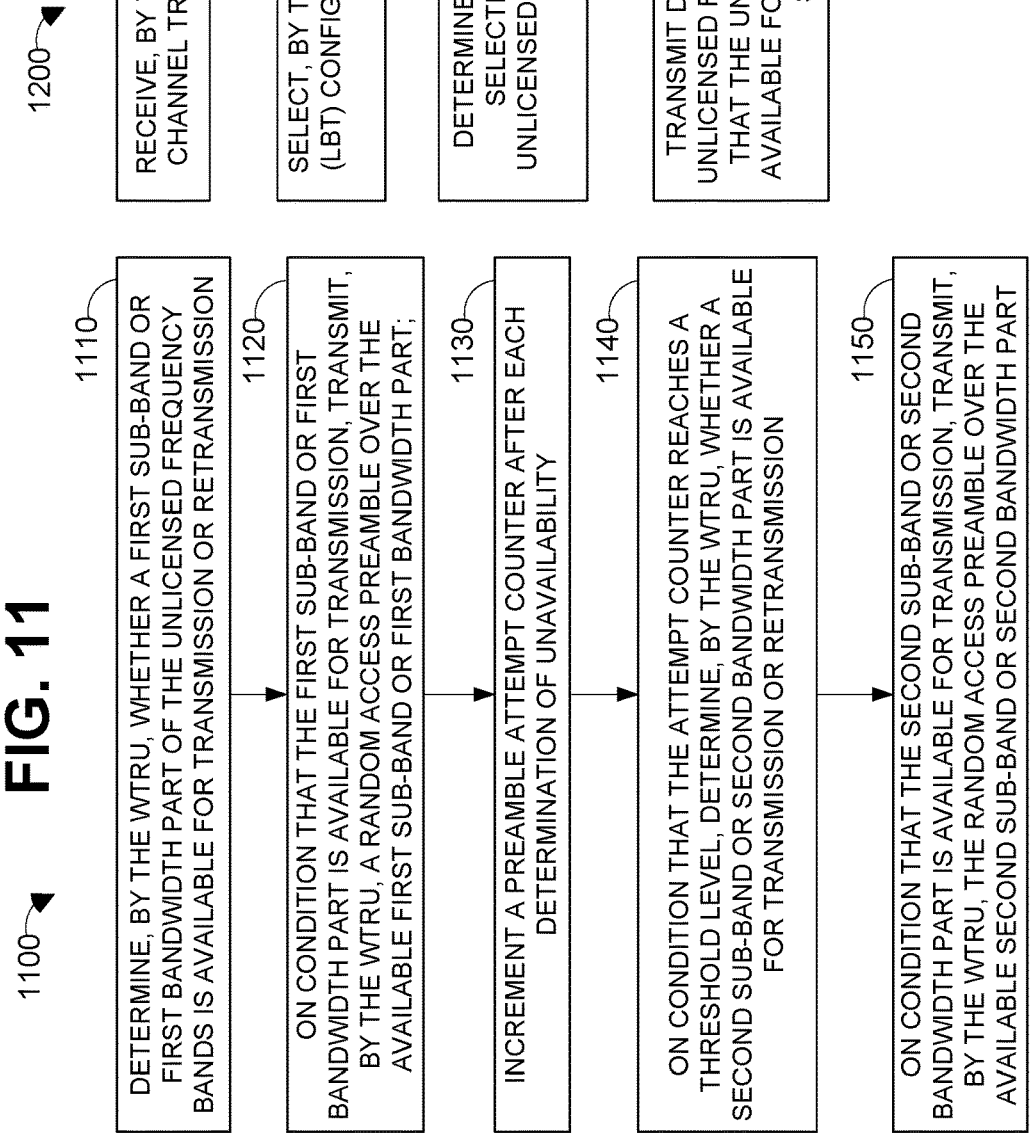

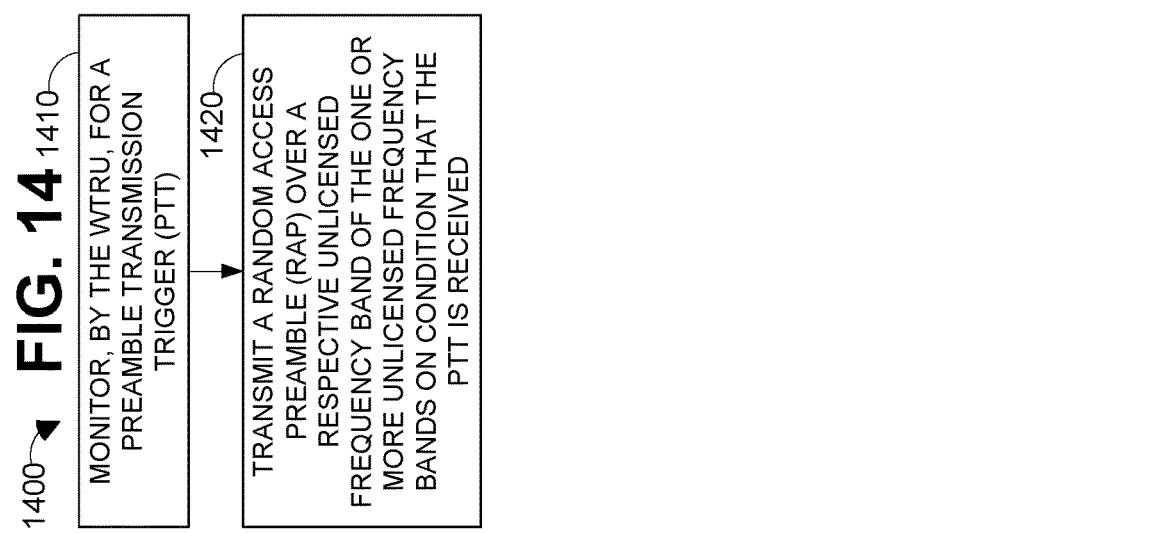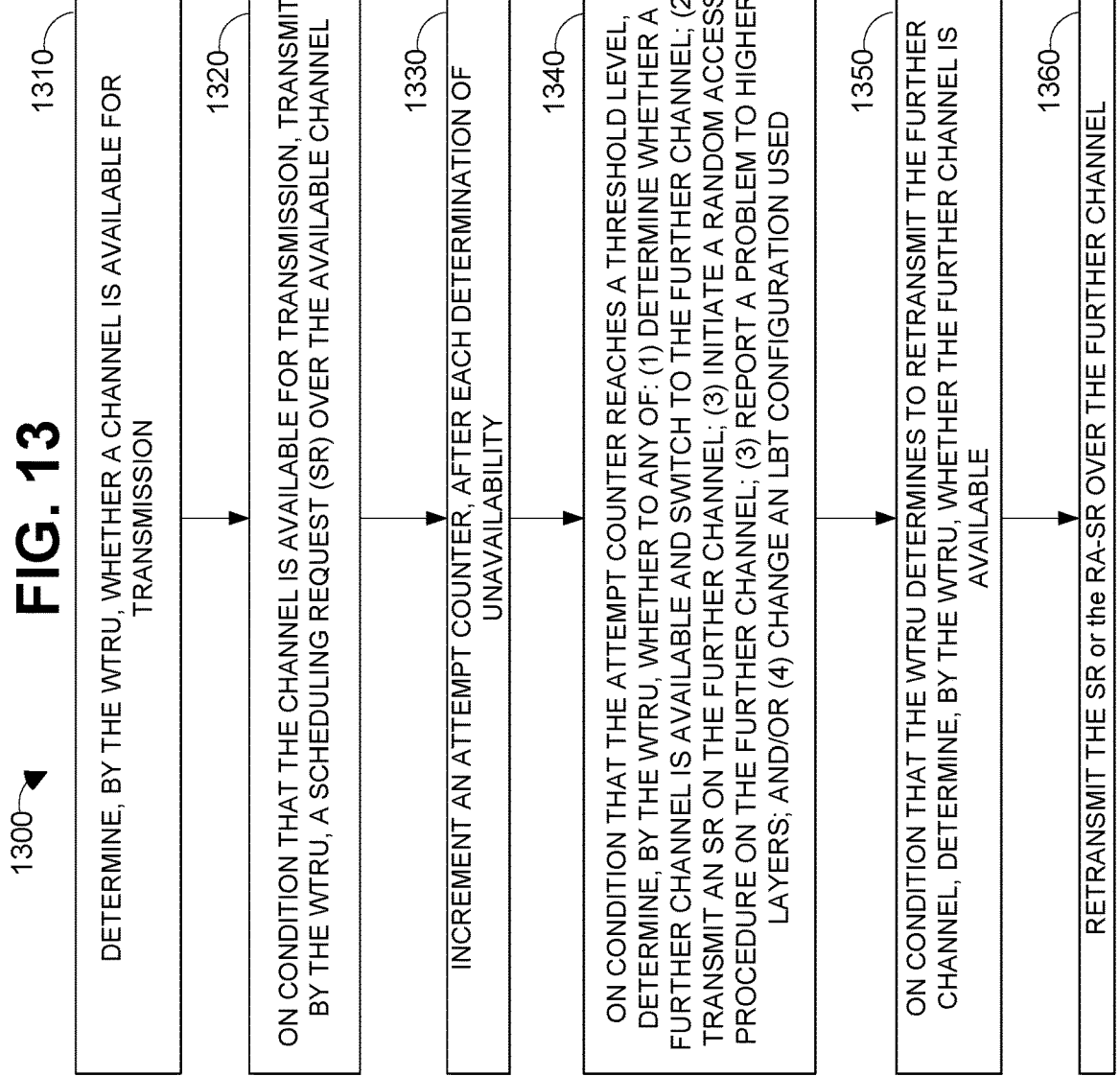

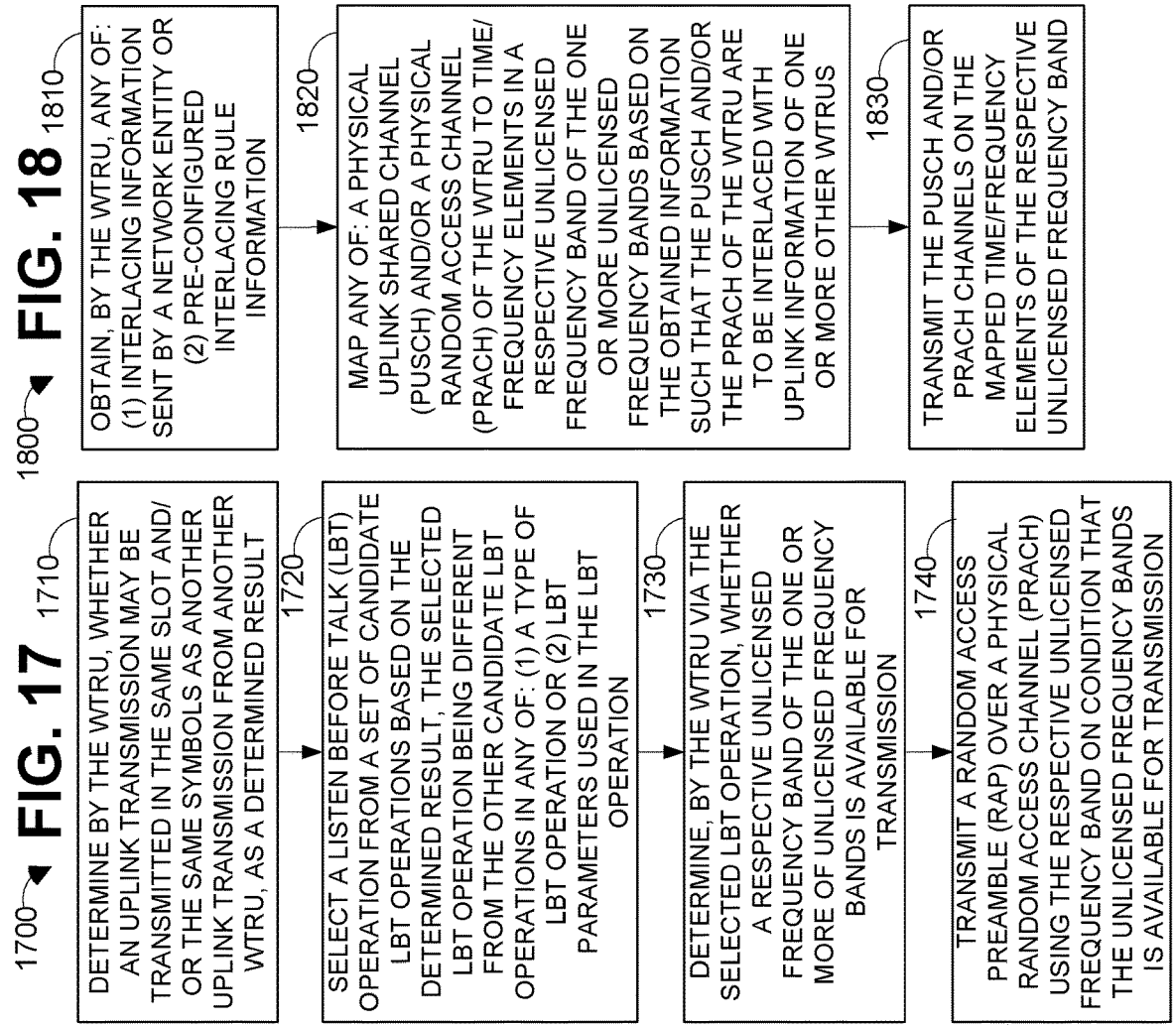

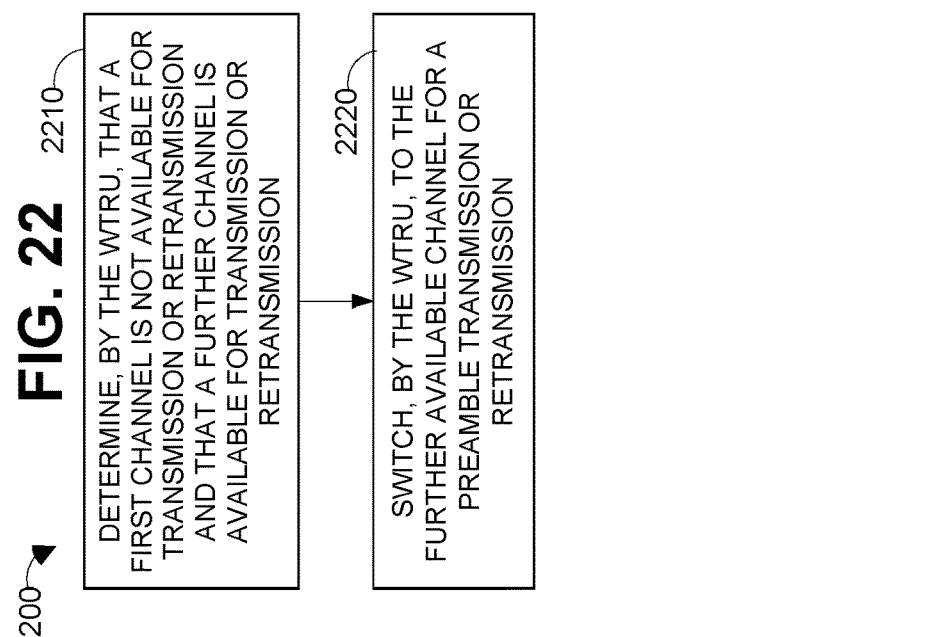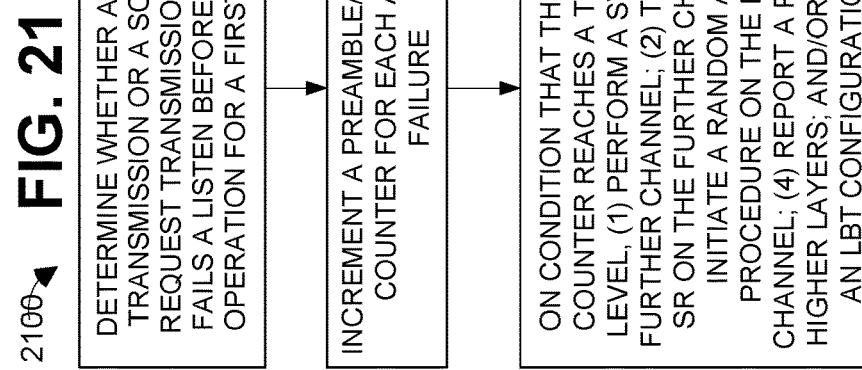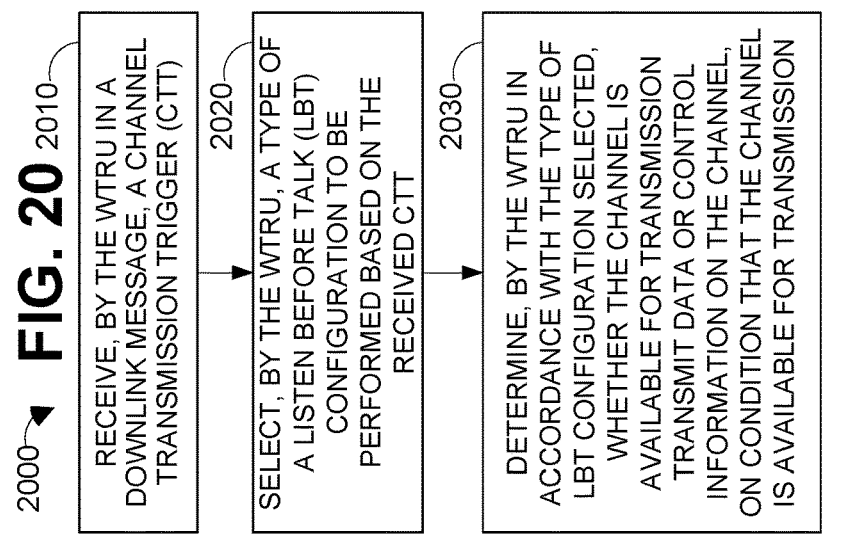

2310 — PERFORM, BY THE WTRU, A LISTEN BEFORE TALK (LBT) OPERATION TO DETERMINE WHETHER THE CHANNEL IS AVAILABLE FOR TRANSMISSION

2320 — ON CONDITION THAT THE CHANNEL IS NOT AVAILABLE, APPLY A RANDOM BACKOFF TO A BACKOFF TIMER IMMEDIATELY OR AFTER THE CHANNEL BECOMES AVAILABLE, WAIT, BY THE WTRU FOR AN EXPIRY OF THE BACKOFF TIMER, AND TRANSMIT, BY THE WTRU, ON THE CHANNEL AFTER THE EXPIRY OF THE BACKOFF TIMER

2410 — DETERMINE, BY THE WTRU, WHETHER THE TWO OR MORE CHANNELS ARE AVAILABLE FOR A POSSIBLE TRANSMISSION

2420 — ON CONDITION THAT A PLURALITY OF THE TWO OR MORE CHANNELS ARE AVAILABLE FOR A POSSIBLE TRANSMISSION, INITIATE, BY THE WTRU, MULTIPLE LBT ATTEMPTS TO TRANSMIT CONTROL INFORMATION ON ONE OF OR A SUBSET OF THE AVAILABLE CHANNELS

2430 — RECEIVE, BY THE WTRU FROM A NETWORK ENTITY, A RESPONSE TO THE CONTROL INFORMATION TRANSMITTED FROM THE WTRU ON ANY OF THE AVAILABLE CHANNELS

2510 — DETERMINE, BY THE WTRU, THAT A LISTEN BEFORE TALK (LBT) OPERATION IS SUCCESSFUL SUCH THAT THE CHANNEL IS AVAILABLE FOR TRANSMISSION

2520 — TRANSMIT A RANDOM ACCESS (RA) PREAMBLE USING THE CHANNEL

2530 — START A TIMER ASSOCIATED WITH AN RA WINDOW TO MONITOR FOR RECEPTION OF AN RA RESPONSE (RAR) TO THE TRANSMITTED RA PREAMBLE

2540 — MONITOR FOR RECEPTION OF THE RAR DURING THE RA WINDOW

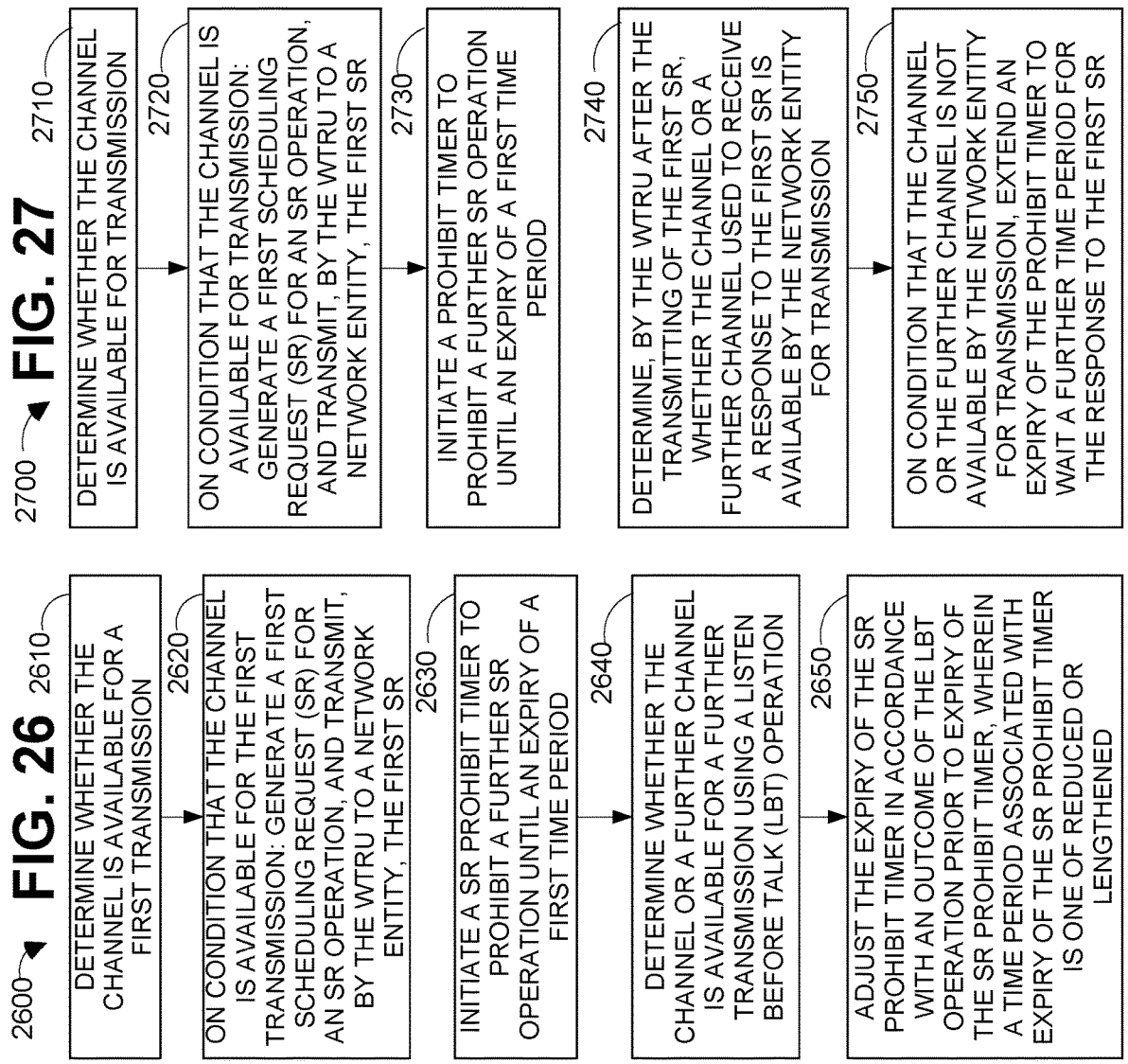

METHODS, APPARATUS AND SYSTEMS FOR SYSTEM ACCESS IN UNLICENSED SPECTRUM

CROSS REFERENCE TO RELATED APPLICATIONS

This application is a 371 U.S. National Stage Application of PCT Application No. PCT/US2019/036313, filed Jun. 10, 2019, which claims priority from U.S. Provisional Application No. 62/686,943, filed Jun. 19, 2018, U.S. Provisional Application No. 62/715,315, filed Aug. 7, 2018 and U.S. Provisional Application No. 62/735,446, filed Sep. 24, 2018, the content of each being incorporated herein by reference.

FIELD

Embodiments disclosed herein generally relate to wireless communications and, for example to methods, apparatus, and systems for system access in unlicensed spectrum.

SUMMARY

Disclosed Embodiments include Methods, Apparatus, and Systems using a channel, as set forth herein. In one representative method, a WTRU may receive in a downlink message, a channel transmission trigger (CTT) and may select a type of Listen Before Talk (LBT) configuration to be performed based on the CTT. The WTRU may further determine, in accordance with the selected type of LBT configuration, whether the channel is available for transmission and may transmit data or control information on the channel, on condition that the channel is available for transmission.

BRIEF DESCRIPTION OF THE DRAWINGS

A more detailed understanding may be had from the detailed description below, given by way of example in conjunction with drawings appended hereto. Figures in the description, are examples. As such, the Figures and the detailed description are not to be considered limiting, and other equally effective examples are possible and likely. Furthermore, like reference numerals in the figures indicate like elements, and wherein:

FIG. 2 is a diagram illustrating a representative random access procedure using a PRACH trigger signal;

FIG. 3 is a diagram illustrating a representative backoff procedure used with LBT operations;

FIG. 6 is a flow chart illustrating a representative procedure using one or more unlicensed frequency bands;

FIG. 7 is a flow chart illustrating another representative procedure using one or more unlicensed frequency bands;

FIG. 8 is a flow chart illustrating a further representative procedure using one or more unlicensed frequency bands;

FIG. 9 is a flow chart illustrating an additional representative procedure using one or more unlicensed frequency bands;

FIG. 10 is a flow chart illustrating a yet further representative procedure using one or more unlicensed frequency bands;

FIG. 11 is a flow chart illustrating a yet additional representative procedure using one or more unlicensed frequency bands;

FIG. 12 is a flow chart illustrating a representative procedure to select a LBT configuration;

FIG. 13 is a flow chart illustrating a representative procedure for retransmission after failure of an LBT operation;

FIG. 14 is a flow chart illustrating a representative procedure using a preamble trigger;

FIG. 17 is a flow chart illustrating a representative procedure using a selected LBT operation;

FIG. 18 is a flow chart illustrating a representative procedure using interlacing information;

FIG. 19 is a flow chart illustrating a representative procedure using a conditional grant indicator;

FIG. 20 is a flow chart illustrating a representative procedure using a channel;

FIG. 21 is a flow chart illustrating another representative procedure using a channel;

FIG. 22 is a flow chart illustrating a further representative procedure using a channel;

FIG. 23 is a flow chart illustrating an additional representative procedure using a channel;

FIG. 24 is a flow chart illustrating yet another representative procedure using a channel;

FIG. 25 is a flow chart illustrating a yet further representative procedure using a channel;

FIG. 26 is a flow chart illustrating a yet additional representative procedure using a channel;

FIG. 27 is a flow chart illustrating a still further representative procedure using a channel; and FIG. 28 is a flow chart illustrating a still additional representative procedure using a channel.

DETAILED DESCRIPTION

Example Networks for Implementation of the Embodiments

Various Embodiments may be implemented in V2X devices, drones, wearable devices, autonomous or semi-autonomous vehicles, robotic device/vehicles, cars, IoT gear, any device that moves, or a WTRU or other communication device, which, in turn, may be used in a communication network. The following section provides a description of some exemplary WTRUs and/or other communication devices and networks in which they may be incorporated.

Figure 1A:
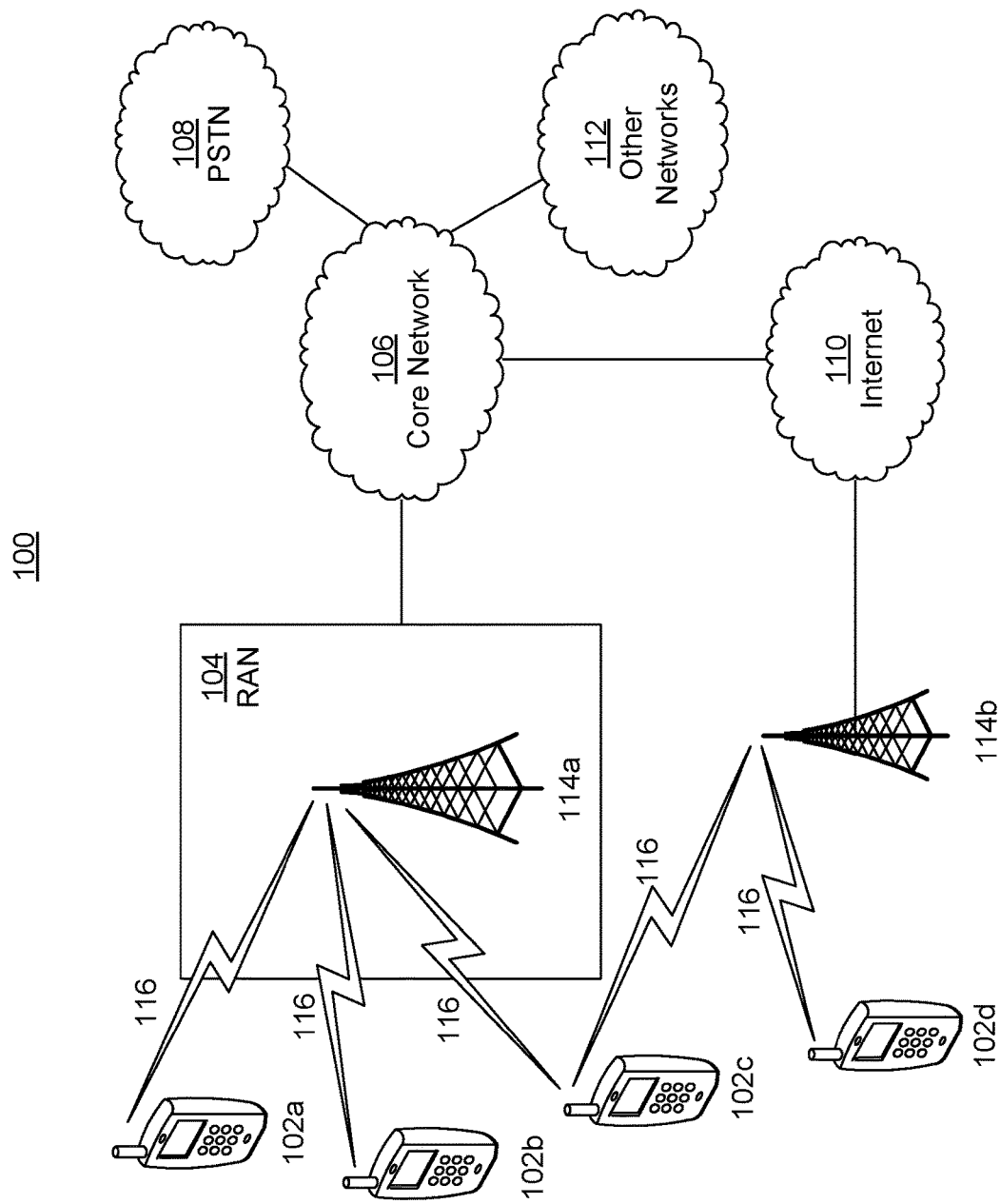
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B (HNB), a Home eNode B (HeNB), a gNB, a NR Node B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB 160 and a gNB 180, among others).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNB, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
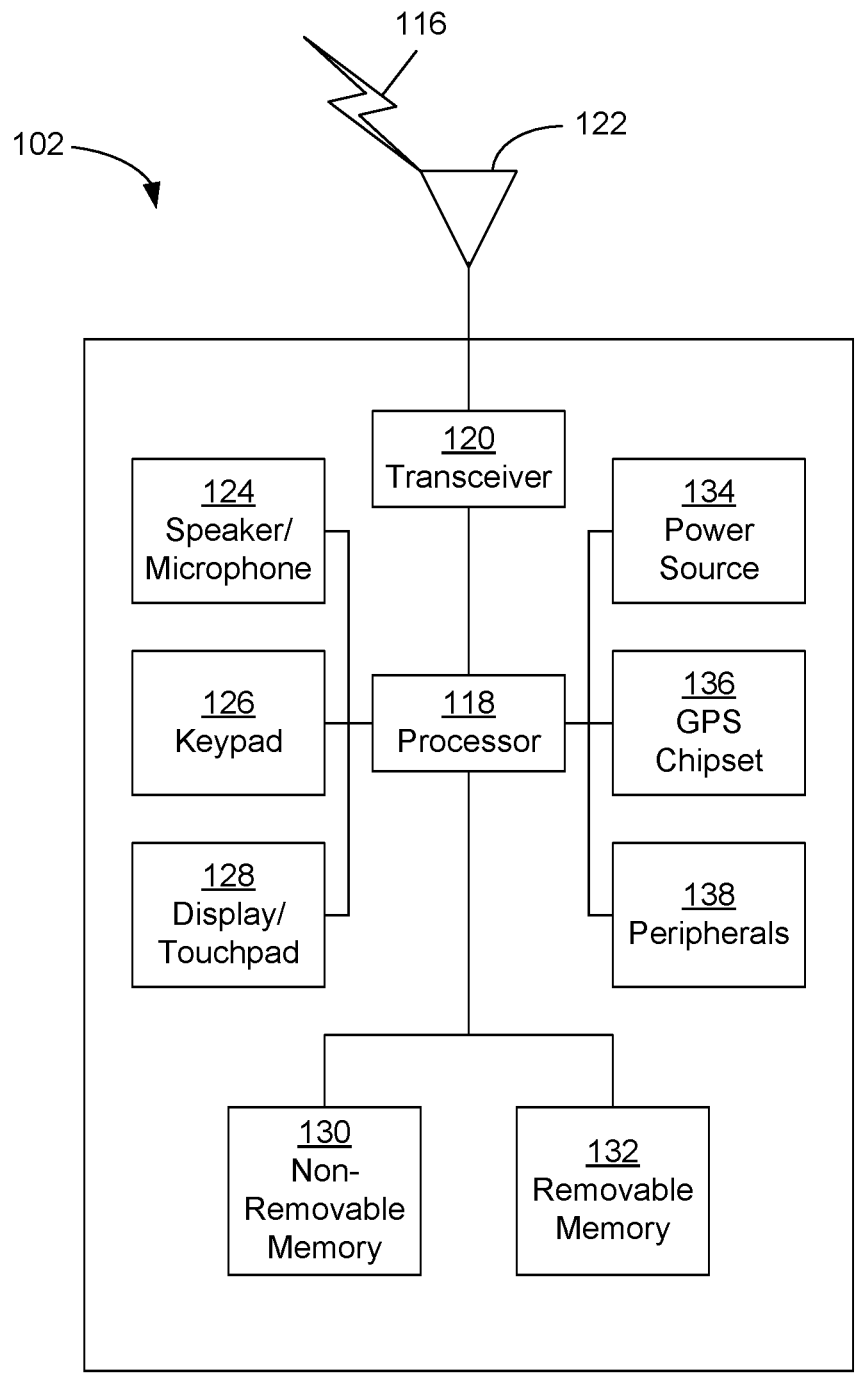
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The processor 118 of the WTRU 102 may operatively communicate with various peripherals 138 including, for example, any of: the one or more accelerometers, the one or more gyroscopes, the USB port, other communication interfaces/ports, the display and/or other visual/audio indicators to implement representative embodiments disclosed herein.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception).

Figure 1C:
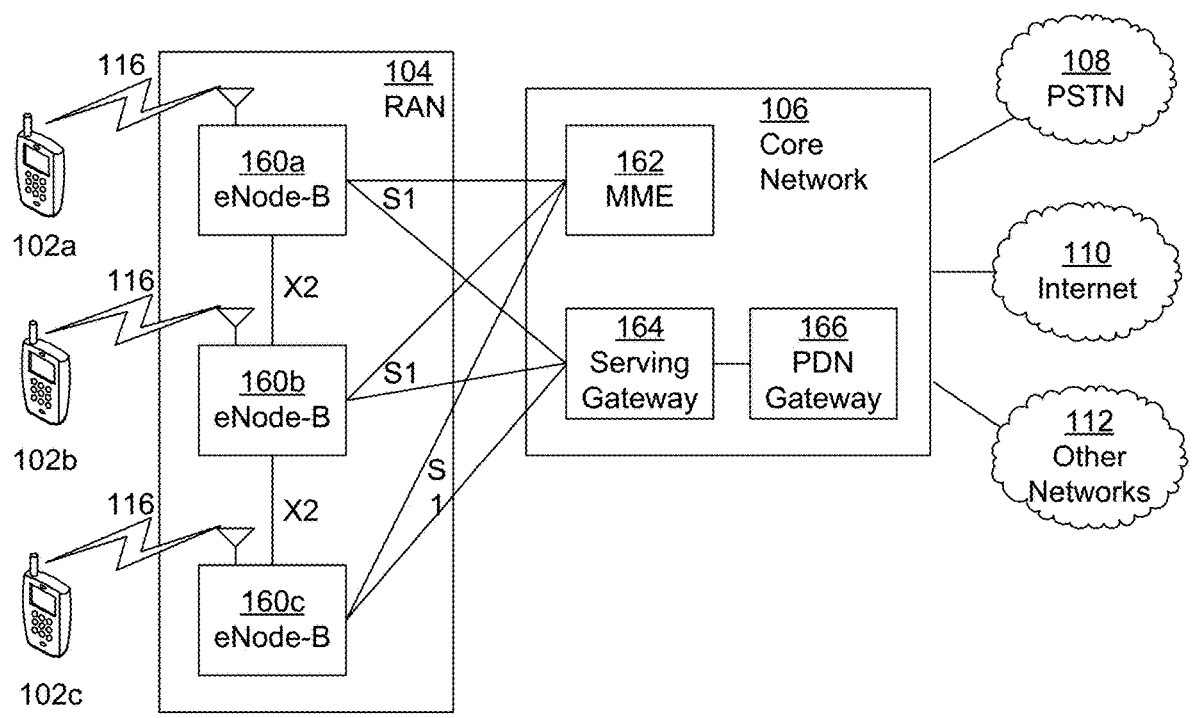
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNBs 160a, 160b, 160c, though it will be appreciated that the RAN 104 may include any number of eNBs while remaining consistent with an embodiment. The eNBs 160a, 160b, 160c may each include one or more transceivers for communicating with the WTRUs 102a, 102b, 102c over the air interface 116. In one embodiment, the eNBs 160a, 160b, 160c may implement MIMO technology. Thus, the eNB 160a, for example, may use multiple antennas to transmit wireless signals to, and/or receive wireless signals from, the WTRU 102a.

Each of the eNBs 160a, 160b, 160c may be associated with a particular cell (not shown) and may be configured to handle radio resource management decisions, handover decisions, scheduling of users in the UL and/or DL, and the like. As shown in FIG. 1C, the eNBs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNBs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNBs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNB handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11 af supports 5 MHz, 10 MHz and 20 MHz bandwidths in the TV White Space (TVWS) spectrum, and 802.11ah supports 1 MHZ, 2 MHz, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
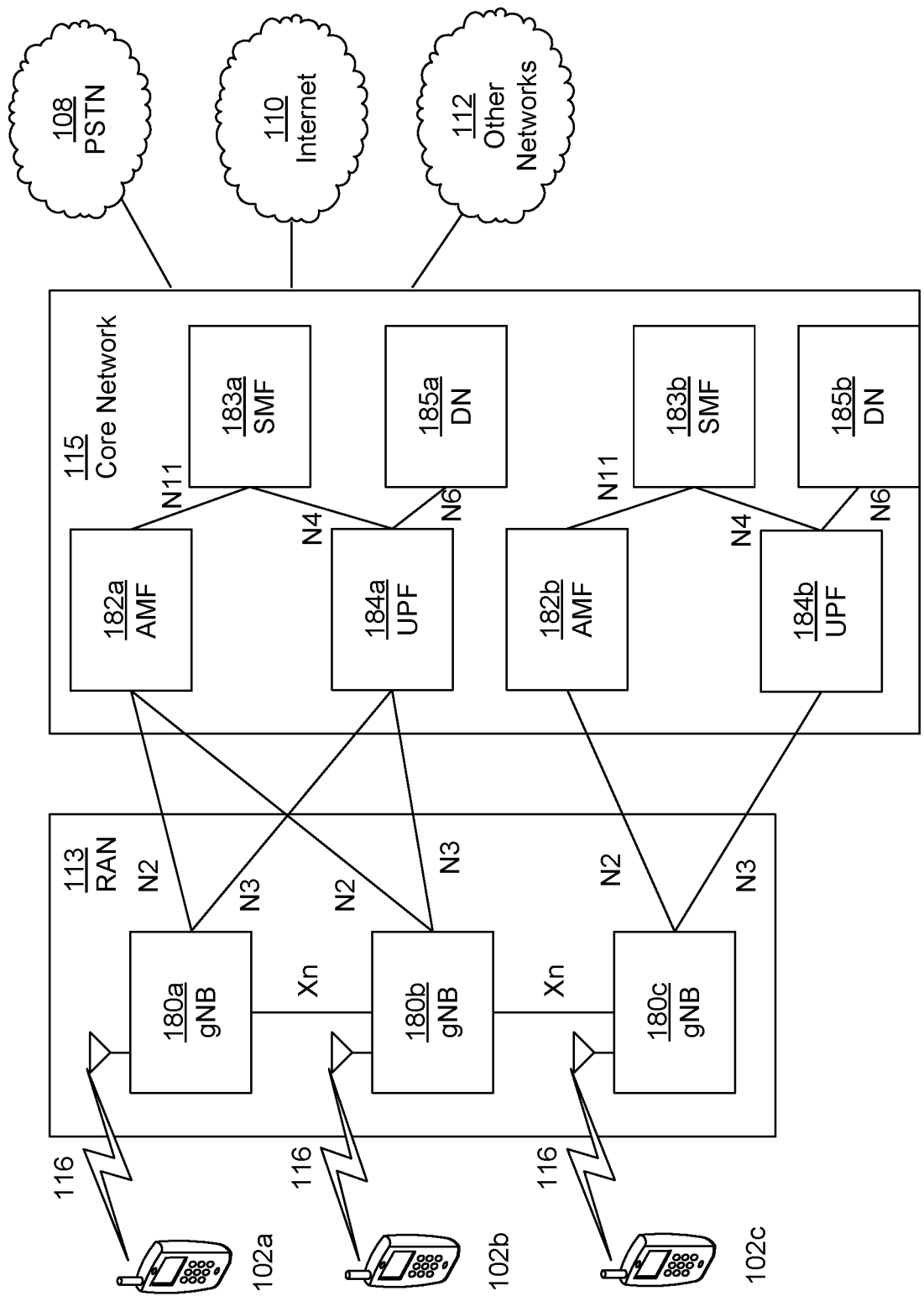
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology.

For example, WTRU 102a may receive coordinated transmissions from the gNB 180a and the gNB 180b (and/or the gNB 180c).

The WTRUs 102a, 102b, 102c may communicate with the gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with the gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with the gNBs 180a, 180b, 180c without also accessing other RANs (e.g., such as eNBs 160a, 160b, 160c). In the standalone configuration, WTRUs 102a, 102b, 102c may utilize one or more of the gNBs 180a, 180b, 180c as a mobility anchor point. In the standalone configuration, WTRUs 102a, 102b, 102c may communicate with the gNBs 180a, 180b, 180c using signals in an unlicensed band. In a non-standalone configuration, the WTRUs 102a, 102b, 102c may communicate with/connect to the gNBs 180a, 180b, 180c while also communicating with/connecting to another RAN such as the eNBs 160a, 160b, 160c. For example, the WTRUs 102a, 102b, 102c may implement DC principles to communicate with one or more gNBs 180a, 180b, 180c and one or more eNBs 160a, 160b, 160c substantially simultaneously. In the non-standalone configuration, eNBs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different Protocol Data Unit (PDU) sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE (or WTRU) IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: the WTRU 102a-d, the Base Station 114a-b, the eNB 160a-c, the MME 162, the SGW 164, the PGW 166, the gNB 180a-c, the AMF 182a-b, the UPF 184a-b, the SMF 183a-b, the DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Representative Unlicensed Operations

Operation in an unlicensed frequency band may be subject to some limits on transmit power control (TPC), RF output power and/or power density, for example, given by the mean Equivalent Isotropic Radiated Power (EIRP) and/or the mean EIRP density at the highest power level. Operation in the unlicensed frequency band may further be subject to requirements and/or limits on the transmitter out-of-band emissions. The requirements and/or limits may be specific to particular frequency bands and/or geographical locations.

Operation may be further subject to requirements/limits on Nominal Channel Bandwidth (NCB) and/or Occupied Channel Bandwidth (OCB), which may be defined for unlicensed spectrum in the 5 GHz region. The NCB (e.g., the widest band of frequencies inclusive of guard bands assigned to a single channel), for example, may be at least 5 MHz at all times. The OCB (e.g., the bandwidth containing 99% of the power of the signal) may be in a range between 80% and 100% of the declared NCB. During an established communication, a device may be allowed to operate (e.g., temporarily operate) in a mode in which its OCB may be reduced to as low as 40% of its NCB with, for example, a minimum bandwidth (e.g., of 4 MHZ).

Channel access in an unlicensed frequency band may use a Listen-Before-Talk (LBT) mechanism. LBT may be mandated (e.g., is typically mandated) independently of whether the channel is occupied or not. In certain representative embodiments, a channel may be a contiguous portion of a frequency band and in other representative embodiments, a channel may be multiple non-contiguous portions of one or more frequency bands. In the context of unlicensed frequency bands, a channel may be the spectrum resources determined by the LBT mechanism/operation to be available for communication. A channel may encompass a set of resources on which a WTRU may perform a single LBT procedure to acquire the occupied channel bandwidth (e.g., LBT bandwidth).

For frame-based systems, an LBT may be characterized by a Clear Channel Assessment (CCA) time (e.g., in the range of ~20 μs), a Channel Occupancy time (COT) (e.g., minimum 1 ms, maximum 10 ms), an idle period (e.g., minimum 5% of COT), a fixed frame period (e.g., equal to the COT+idle period), a short control signaling transmission time (e.g., maximum duty cycle of 5% within an observation period of 50 ms), and/or a CAA energy detection threshold.

For load-based systems, a transmit/receive structure may not be fixed in time), LBT may be characterized by a number N corresponding to the number of clear idle slots in extended CCA, for example, instead of the fixed frame period. N may be selected (e.g., selected randomly) within a range.

Deployment scenarios may include different standalone NR-based operation, different variants of dual connectivity operation e.g., EN-DC, for example, with at least one carrier operating according to the LTE radio access technology (RAT) or NR DC, for example, with at least two sets of one or more carriers operating according to the NR RAT, and/or different variants of carrier aggregation (CA) e.g., possibly also including different combinations of zero or more carriers of each of LTE and NR RATs.

For example, for LTE, any combination of the following functionalities may be implemented in a License Assisted Access (LAA) system:

(1) LBT (CCA) in which the LBT procedure (sometimes referred to as an LBT operation) may be defined as a mechanism by which the equipment may or is to apply a CCA check before using the channel. The CCA may utilize at least energy detection to determine the presence or absence of other signals on a channel to determine if the channel is occupied or clear, respectively. Certain regulations and/or operations may mandate the usage of LBT in the unlicensed frequency bands. Apart from regulatory/operational requirements, carrier sensing via LBT is one way for fair sharing of the unlicensed spectrum and may be a vital feature for fair and friendly operation in the unlicensed spectrum, for example in a single global solution framework.

(2) Discontinuous transmission on a carrier with limited maximum transmission duration, (in unlicensed spectrum, channel availability cannot be (e.g., cannot always be) guaranteed. For example, certain regions (such as Europe and Japan) may prohibit continuous transmission and/or may impose limits on the maximum duration of a transmission burst in the unlicensed spectrum. Discontinuous transmission with limited maximum transmission duration may be required and/or an appropriate functionality for LAA).

(3) Carrier selection (e.g., as there is a large available bandwidth of unlicensed spectrum, carrier selection may be required and/or appropriate for LAA nodes to select the carriers with low interference (e.g., below a threshold level) and with such interference to achieve good co-existence with other unlicensed spectrum deployments).

(4) TPC (e.g., TPC may be a regulatory requirement and/or may be appropriate in some regions by which the transmitting device may be able to and/or is to reduce the transmit power in a proportion of 3 dB or 6 dB compared to the maximum nominal transmit power).

(5) Radio resource management (RRM) measurements (e.g., including cell identification may enable mobility between SCells and/or robust operation in the unlicensed frequency band).

(6) Channel-State Information (CSI) measurement (e.g., including channel and interference).

A WTRU operating in an unlicensed carrier may support frequency/time estimation and synchronization to enable RRM measurements, for example for successful reception of information on the unlicensed frequency band.

In certain representative embodiments, a gNB may trigger one or more WTRUs to indicate an upcoming PRACH opportunity or opportunities with certain LBT considerations. The WTRU may determine the LBT configuration from the trigger contents or the trigger reception time relative to the corresponding uplink transmission.

In certain representative embodiments, a WTRU may monitor a PRACH resource trigger signal explicitly and/or implicitly, e.g., according to a preconfigured pattern. The trigger signal may indicate a PRACH configuration/resource.

In certain representative embodiments, a WTRU may skip and/or apply a different LBT configuration prior to Message 3 (msg3) transmission, for example if the WTRU is configured with and/or signaled to indicate one or more switching points for a COT (explicitly signaled to indicate or implicitly signaled based on the context of the Random Access (RA) procedure) acquired from, via or by the gNB.

In certain representative embodiments, the WTRU may adjust its Random Access Response (RAR) timer and its contention resolution timer according to channel occupancy conditions.

In certain representative embodiments, the WTRU may attempt to transmit/receive Messages 1, 2, 3 and/or 4 (msg1/2/3/4) by performing LBT on multiple resources, possibly on different sub-bands, BWPs, cells, and/or channels subject to independent LBTs (e.g., independent LBT operations).

In certain representative embodiments, the WTRU may maintain a preamble/SR attempt counter, which may be incremented each time the MAC instructs the PHY to transmit a preamble/SR regardless of the outcome of the LBT, or each time a preamble/SR transmission attempt fails LBT. The WTRU may reset the counter upon switching to a different channel and/or upon expiry of a related timer.

In certain representative embodiments, the WTRU may switch to a different LBT sub-band, BWPs, cells, and/or channels when the preamble/SR attempt counter is above a certain threshold. The WTRU may further (1) initiate a Random Access procedure; (2) retransmit a preamble or a SR; and/or (3) report a radio link problem to higher layers.

In certain representative embodiments, the WTRU may apply a backoff value determined by the WTRU according to a preconfigured and/or signaled value, depending on channel occupancy conditions.

In certain representative embodiments, the WTRU may apply a different LBT window and/or configuration depending on an RA priority.

In certain representative embodiments, a Scheduling Request (SR) procedure in NR-Unlicensed (NR-U) may include any of: a triggered Physical Uplink Control Channel (PUCCH) transmission, a SR retransmission, a SR triggering and/or cancellation, and/or a SR prohibit timer adjustment.

In certain representative embodiments, methods, procedures, operations, apparatus, and/or systems may be implemented for a WTRU to determine PUCCH resource applicability according to reception of a PUCCH resource trigger signal. A gNB may trigger one or more WTRUs to indicate an upcoming PUCCH opportunity or opportunities with certain LBT considerations.

In certain representative embodiments, methods, procedures, operations, apparatus, and/or systems may be implemented for a WTRU to adjust the SR prohibit timer of a pending SR depending on the channel occupancy conditions, or depending on whether a failure of an LBT (e.g., an LBT operation) occurred for one or more PUSCH resources provided after transmitting the SR.

In certain representative embodiments, methods, procedures, operations, apparatus, and/or systems may be implemented for a WTRU, for example capable of supporting and/or using multiple active Bandwidth Parts (BWPs), to trigger an additional SR (e.g., on a different sub-band and/or BWP upon certain conditions).

In certain representative embodiments, methods, procedures, operations, apparatus, and/or systems may be implemented for a WTRU to cancel a pending SR and/or a pending BSR upon transmitting a PDU containing or including a Buffer Status Report (BSR) Medium Access Control Control Element (MAC CE) and/or upon an indication (e.g., from the PHY (e.g., the physical layer) that the LBT operation was successful for the corresponding PUSCH transmission.

In certain representative embodiments, methods, procedures, operations, apparatus, and/or systems may be implemented, for example, on triggered PRACH transmission (e.g., when to and/or how to perform an LBT operation when triggered for the PRACH).

In certain representative embodiments, methods, procedures, operations, apparatus, and/or systems may be implemented, for example, to perform beam indication when SSBs are transmitting opportunistically.

In certain representative embodiments, methods, procedures, operations, apparatus, and/or systems may be implemented a modified LBT (e.g., a modified LBT operation), for example to enable WTRU multiplexing of PRACH and other UL channels.

In certain representative embodiments, methods, procedures, operations, apparatus, and/or systems may be implemented, for example, to enable interlaced PRACH and PUSCH (e.g. for a multi-step RACH, for example a 2-step RACH).

In certain representative embodiments, methods, procedures, operations, apparatus, and/or systems may be implemented, for example for conditional configured grants and the triggering thereof.

In certain representative embodiments, the WTRU may be configured to apply a differentiated LBT configuration for a preamble transmission upon or after initiating a high priority random access procedure.

In certain representative embodiments, the WTRU may be configured to apply a certain LBT configuration for a SR transmission, whereby the LBT configuration may be selected according to the selected SR configuration and/or the logical channel that triggered the pending SR.

Representative Operations in 3GPP Release 15 (R15) New Radio (NR)

In NR, a WTRU may operate using bandwidth parts (BWPs) in a carrier. A WTRU may access a cell using an initial BWP. After, the WTRU may be configured with a set of BWPs to continue operation. In certain representative embodiments, at any given moment, a WTRU may have one active BWP. In other representative embodiments, the WTRU may have one or more active BWPs. Each BWP may be configured with a set of CORESETs within which a WTRU may blind decode Physical Downlink Control Channel (PDCCH) candidates for scheduling, among other things.

A NR system may support and/or may implement variable transmission duration and/or feedback timing. With variable transmission duration, a Physical Downlink Shared Channel (PDSCH) transmission and/or a Physical Uplink Shared Channel (PUSCH) transmission may occupy a contiguous subset of symbols of a slot. With variable feedback timing, the Downlink Control Information (DCI) for a downlink (DL) assignment may include an indication for the timing of the feedback for the WTRU (e.g., by pointing to a specific PUCCH resource).

A NR system may support and/or may implement different types of Physical Uplink Control Channel (PUCCH) resources (e.g., two or more types of PUCCH resources), for example a short PUCCH and/or a long PUCCH. The short PUCCH may be transmitted using 1 or 2 OFDM symbols and the long PUCCH may use up to 14 OFDM symbols. Each PUCCH type may have multiple formats, for example that may depend on the type and/or the size of a corresponding payload.

A RA procedure in NR may be prioritized, depending on the RA initiation type, for example. A prioritized RA (e.g., RACH) procedure may use differentiated backoff and/or power ramping values configured by the network (e.g., a network entity).

A NR WTRU may be configured with multiple SR configurations. A SR configuration may be a set of PUCCH resources with a certain periodicity. In certain representative embodiments, the Radio Resource Control (RRC) may configure logic channels (e.g., each logical channel) to use a single SR configuration.

In a beamformed cell (e.g., a NR-licensed beamformed cell), an association between beams (represented by SSBs and/or CSI-RS) and PRACH resources or preambles may be configured, for example to aid the WTRU with indicating to the network (e.g., a network entity and/or gNB) which beam may be or is best for the reception of RAR and/or further downlink signals. For example, consecutive SSBs may be mapped to consecutive PRACH occasions in the time domain. A Synchronization Signal (SS) burst may be a set of consecutive SSBs used to transmit synchronization signals. In the context of a beamformed NR-U cell, a subset of beams within a SS burst may be missing due to an LBT failure. The transmission timing of the missing SSBs may be indicated by a timing offset and/or determined by the WTRU by assuming that missing SSBs is to be cyclically transmitted after the last SSB in the SS burst, for example.

Representative WTRU Operations in Unlicensed Bands for NR Release 16 (R16)

In certain representative embodiments, methods, apparatus, and system may be implemented to support operation in unlicensed bands for R16 operations including initial access, RA, Scheduling/HARQ, and/or mobility, along with coexistence operations/procedures with LTE-LAA and other incumbent RATs. For example, such embodiments may include NR-based LAA cell connected with an LTE anchor and/or a NR anchor cell, as well as NR-based cell operating standalone using unlicensed spectrum.

In certain representative embodiments, methods, apparatus, and system may be implemented to support operation in unlicensed bands for RA including, for example enhancement to the PRACH physical channel structure and/or the RA procedure, interlacing PRACH signals, for example, similar to interlacing PUSCH transmissions in eLAA, which may be beneficial in sharing the channel while meeting the OCB requirements.

In certain representative embodiments, methods, apparatus, and system may be implemented to support operations in unlicensed bands for RA for an NR-U cell in standalone mode and LTE-NR deployment scenarios. For RA for the NR-U cell, since the preamble, RAR, msg3, and/or msg4 transmissions may be subject to LBT outcomes, a multi-step (e.g., four step) RA procedure, for example, may use and/or require up to four independent LBT procedures prior to the respective transmission without even considering retransmissions. Using and/or requiring CCA prior to applying the multi-step RA procedure to NR-U cells may cause delays (e.g., considerable delays) (for example, until the completion of the multi-step RA procedure).

In NR-licensed, a Physical Random Access Channel (PRACH) occasion may represent a system access opportunity on a time-frequency resource provided by the network entity (e.g., the gNB), where multiple WTRUs may initiate simultaneous RA procedures on the same PRACH occasion if different preambles were selected. In NR-U, a PRACH occasion may represent a conditional system access opportunity subject to an LBT outcome. A single WTRU transmitting a preamble on a given PRACH occasion may block other WTRUs from transmitting another preamble on the same channel and may affect the RACH capacity in the NR-U cell. For a WTRU in connected mode, transmitting a SR or Uplink Control Information (UCI) on the PUCCH in NR-U may be subject to and/or may use LBT procedures.

Representative LBT Impact on the RA Procedure

Representative Triggered PRACH Opportunities

FIG. 2 is a diagram illustrating a representative RA procedure 200 that sends a PRACH transmission (e.g., PRACH 220a and/or 220b) upon receiving a trigger signal 210 (e.g., a PRACH trigger signal 210).

Referring to FIG. 2, the RA procedure 200 may include a first WTRU 102a that may desire to initiate a RA procedure 230a. Later, a second WTRU 102b may desire to initiate a RA procedure 230b. The channel may be busy (e.g., for a channel busy period 215) and/or the first and second WTRUs 102a and 102b may wait for the PRACH trigger signal 210. For example, a network entity (e.g., the gNB 180a) may send (e.g., to broadcast, multicast and/or unicast) the PRACH trigger signal 210 indicating that the first and second WTRUs 102a and 102b may send a PRACH transmission 220a and 220b, for example indicating that the channel is available (e.g., that the channel is not busy and/or is no longer busy). While the channel is busy (e.g., during the channel busy period 215), the gNB 180a may not send the PRACH trigger signal 210. After the channel is available (e.g., after the channel busy period 215 ends and/or after the channel is determined by the gNB 180a to be available and/or clear), the gNB 180a may send the PRACH trigger signal 210. The first and second WTRUs 102a and 102b may monitor for and may receive the PRACH trigger 210. After or responsive to receiving the PRACH trigger signal 210, the first WTRU 102a may send a RA preamble transmission 220a, for example to begin the RA procedure for the WTRU 102a. After or responsive to receiving the PRACH trigger signal 210, the second WTRU 102b may similarly send a RA preamble transmission 220b, for example to begin the RA procedure for the WTRU 102b.

The WTRU 102a and 102b may be indicated and/or configured with PRACH resources on which the WTRU 102 may transmit a PRACH preamble (e.g., a PRACH preamble transmission 220) (e.g., to begin or initiate a RA procedure). The PRACH resources may include at least one of: (1) time resources (e.g., a set of symbols), (2) frequency resources (e.g., a set of physical Resource Blocks (PRBs), (3) one or more analog/digital/hybrid precoders (e.g., one or more transmit beams), (4) one or more cover codes or preambles (e.g., to enable orthogonal or non-orthogonal multiple access), (5) one or more interlace patterns (e.g. a subset of subcarriers or PRBs on which to transmit), and/or (6) one or more LBT configurations, among others. An LBT configuration may be: (1) received by the WTRU 102 from a broadcasted transmission, (2) a semi-static configuration; (3) determined based on an indication (e.g., semi-static or dynamic indication); (4) determined from the timing between the trigger signal; and/or (5) determined from the time gap between the trigger signal and the applicable uplink transmission. An LBT configuration or LBT parameter may encompass at least: (1) the channel access priority class; (2) the LBT category or type; (3) the congestion window size, and/or (4) parameters used to determine the UE is able to acquire the channel or transmit an uplink signal on it.

To perform PRACH preamble transmission 220 on the PRACH resources, the WTRU 102 may perform an LBT operation prior to configuring the resources. The WTRU 102 may use the LBT configuration which may be tied to the transmission of the PRACH preamble 220. For example, a WTRU 102 may have a specific LBT configuration that may be applicable to (e.g., only applicable to) the transmission of the PRACH preamble 220.

In another representative operation, a WTRU 102 desiring and/or needing to transmit a PRACH preamble 220, may receive a PRACH preamble transmission trigger 210 (e.g. tied to one or more PRACH resources) prior to transmission of the PRACH preamble 220. The WTRU may expect to receive a signal that indicates an upcoming PRACH resource is valid. Reception of the indication may affect the type of LBT (and/or the LBT parameters) to be used for the PRACH resource. For example: (1) for a PRACH resource for which a WTRU 102 did not receive a PRACH trigger signal 210 (e.g., a preamble transmission trigger), a WTRU 102 may use a full LBT procedure prior to transmission of a PRACH preamble 220; and (2) for a PRACH resource for which the WTRU 102 received the PRACH preamble transmission trigger 210 (e.g., a PRACH trigger signal) 210, the WTRU 102 may use a higher priority LBT (e.g., a LBT configuration whose parameters may be relaxed to increase a likelihood of channel acquisition) or may use no LBT procedure at all.

In other representative embodiments, a WTRU 102 (e.g., triggered to perform RA) may perform an LBT operation and/or another channel access procedure such that a period of time may exist between an end of LBT operation and a beginning of the PRACH preamble transmission 220. During this gap (e.g., this gap period), the WTRU 102 may listen to determine if a PRACH trigger signal 210 has been transmitted. Upon and/or after reception of a PRACH trigger signal 210 and a previous determination that a channel was unoccupied (e.g., a successful LBT operation), the WTRU 102 may transmit a PRACH (e.g., the PRACH preamble transmission) 220 in applicable PRACH resources. A WTRU 102 may be configured with resources (e.g., LBT configuration information including, for example timing) on which the WTRU 102 may perform the LBT (e.g., the LBT operation) for an upcoming PRACH (or other UL) transmission. For example, the WTRU 102 may be configured with a time offset between an end of an LBT operation and an associated UL transmission resource. The timing offset, for example, may enable a WTRU 102 to listen for a PRACH trigger signal 210 to validate a UL transmission (e.g., to validate the use of a PRACH resource, and/or to validate an UL grant).

The WTRU 102 may determine a RA procedure type, a RA procedure (e.g., using 2 operations or 4 operations) and/or parameters of a RA procedure (e.g., RAR and/or contention resolution timers, and/or a backoff value, among others, as discussed herein) based on timing of the LBT operation (e.g., when the LBT operation is, is to be or was performed), the RA procedure success or lack thereof and the reception or lack thereof of a trigger signal 210. For example, if a WTRU 102 performs an LBT operation prior to receiving a trigger signal 210 and/or determines that the channel is clear, and then receives the trigger signal 210 from the gNB 180, the WTRU 102 may use a first RA procedure type and a first set of RA procedure parameters. In another example, if a WTRU 102 receives a trigger signal 210 without having first performed an LBT operation (or after having failed the LBT operation for RA prior to receiving the trigger signal 210), the WTRU 102 may then perform an LBT operation (whose parameters may be determined based on the reception of the trigger signal 210) and upon and/or after a successful LBT operation may use a second RA procedure type with a second set of RA procedure parameters. In further examples, a WTRU 102 (e.g., having received a trigger signal 210 and having failed an LBT operation either before and/or after the reception of the trigger signal 210) may perform an RA using a third RA procedure type with a third set of RA procedure parameters. In another example, a WTRU 102 (e.g., having performed LBT and determined that the channel is clear, but not having received a trigger signal 210) may perform an RA using a fourth RA procedure with a fourth set of RA parameters. Herein, the term UL LBT failure implies that the UE was not able to acquire the channel for an uplink transmission attempt after a CCA part of an LBT procedure, which may be determined based on receiving a "notification of LBT failure" or "indication of LBT failure" from the physical layer, among other determination methods. The opposite applies when the term uplink LBT success is used.

The ability to perform the RA despite (1) failing the LBT operation; and/or (2) having not received a trigger signal 210 may depend on an RA trigger. For example, a subset of the RA triggers may enable a WTRU to perform PRACH transmission 220 despite (1) failing the LBT operation (e.g., prior to reception, after reception or expected reception of the trigger signal 210); and/or (2) failing to receive the trigger signal 210. In another procedure/process, the ability to perform RA despite (1) failing the LBT operation; and/or (2) not receiving a trigger signal 210 may depend on a service type for which the RA is being performed.

Representative Trigger Signal

The trigger signal (e.g., PRACH preamble transmission trigger 210) may be an implicit indication or an explicit indication. An example of implicit triggering may be that if a WTRU 102 receives a transmission from the network (e.g., a gNB 180), the WTRU 102 may expect an upcoming PRACH resource to be valid. Such a transmission may include at least one of: (1) one or more Discovery Reference Signals (DRSs), (2) one or more Synchronization Signal Blocks (SSBs), (3) one or more Reference Signals (RSs), (4) one or more control channels (e.g., a PDCCH), and/or (5) one or more Master Information Blocks (MIBs)/System Information Blocks (SIBs), among others). For example, a WTRU 102 receiving a DL transmission from the network (e.g., a network entity such as a gNB 180) may determine and/or assume that a PRACH resource (e.g., any PRACH resource) within the COT tied to the DL transmission is valid. In another example, a WTRU 102 may begin a timer after or upon receiving a DL transmission and a PRACH resource (e.g., any PRACH resource) occurring (e.g., used) before expiration of the timer, may be considered valid by the WTRU 102, or valid for transmission with a certain LBT configuration. In certain representative embodiments, the WTRU 102 may use and/or consider the reception of an SSB, as a trigger, for the PRACH resources associated with the one or more SSBs.

A WTRU 102 may determine/expect that transmission of a signal explicitly indicates one or more upcoming PRACH resources are valid. For example, a WTRU 102 may monitor a broadcast channel to attempt to receive an indication of valid PRACH resources. In another example, a WTRU 102 may monitor the PDCCH (e.g., a group common PDCCH or a WTRU addressed PDCCH) to attempt to receive the trigger signal 210 (e.g., PRACH resource trigger signal). The WTRU 102 may monitor a certain search space, and/or coreset to receive the trigger signal 210 (e.g., PRACH resource trigger signal).

Such an indication may point to a pre-configured or scheduled PRACH resource. For example, the indication may provide a PRACH resource configuration (e.g. a dynamic PRACH resource indication).

When the WTRU 102 determines and/or expects to use one of a pre-configured set of PRACH resources, the WTRU 102 may monitor specific instances and/or channels where a trigger signal 210 may be sent for the PRACH resources (e.g., each PRACH resource). For example, there may be a relationship (e.g., one-to-one, many-to-one or one-to-many) between one or more triggering signals 210 and one or more PRACH resources. A WTRU 102 determining, planning, wishing and/or desiring to use an upcoming PRACH resource may monitor one or more specific instances where a triggering signal 210 may be received. For such operations, there may be an implicit (predetermined, known a priori and/or signaled) relationship between one or more trigger signal occasions and one or more PRACH resources.

In another operation, a WTRU 102 may be configured with trigger signal patterns (e.g., PRACH resource trigger signal monitoring patterns). For example, when needed and/or appropriate, a WTRU 102 may monitor PRACH resource trigger signal occasions (e.g., all PRACH resource trigger signal occasions). The WTRU may expect (e.g., be configure such) that the trigger signal provides the PRACH resource configuration.

Representative Trigger Signal Content

A trigger signal 210 (e.g., a PRACH resource trigger signal) may provide a PRACH resource configuration, for example, as defined herein. A PRACH resource trigger signal 210 may indicate the validity of a set of pre-configured PRACH resources. For example, the PRACH resource trigger signal 210 may provide a subset of configurations (e.g. a resource allocation, preambles, and/or interlaces) for one or more upcoming PRACH resources.

A trigger signal 210 (e.g., a PRACH resource trigger signal) may indicate the validity of a PRACH resource on one or multiple sub-bands. For a WTRU 102, for example in connected mode, the PRACH trigger signal 210 (e.g., the PRACH resource trigger) may provide an order to perform RA on a given PRACH configuration. For example, a PRACH trigger signal may cause and/or order one or multiple WTRUs 102 to perform RA operations on a given sub-band, one or more preambles, and/or one or more PRACH resources. The WTRU 102 may be ordered on the PDCCH to perform RA operations, similarly, including RA on a different sub-band.

The PRACH resource trigger signal (e.g., the PRACH resource trigger) may indicate one or more purposes (e.g., a set of purposes) for which the PRACH resource may be used and a WTRU 102 may transmit (e.g., only transmit) a PRACH preamble, if the preamble is for one of the purposes indicated in the PRACH resource trigger signal 210. The PRACH preamble purposes for a PRACH resource may include any of: (1) an initial access, (2) a beam failure recovery (BFR), (3) a mobility (e.g., a handover), (4) UL synchronization being lost, (5) an RRC connection re-establishment, (6) a Scheduling Request (SR) transmission, and/or (7) a timing advance acquisition, possibly along with a service type. The PRACH resource trigger may indicate any of: (1) a priority of the RA for which the PRACH resource is valid and/or (2) a set of WTRUs 102 for which the PRACH resource is valid. For example, a group Radio Network Temporary Identifier (RNTI) may be included in the PRACH resource trigger.

For a beamformed NR-U cell, the WTRU 102 may determine that a subset of SSBs within an SS burst were not transmitted or are delayed due to an LBT failure (e.g., an LBT operation failure) and/or similarly for CSI-RS, the WTRU 102 may determine that one or more CSI-RSs (e.g., all or a subset of CSI-RSs) were not transmitted or are delayed due to an LBT failure. The trigger signal after the SS burst may indicate and/or may imply: (1) a change to the configured association rule between the SSBs (and/or CSI-RS) and PRACH occasions/preambles; (2) an availability and/or an applicability status for a subset of SSBs (and/or CSI-RSs) for selection when determining which SSB/CSI-RS to select (or which corresponding PRACH occasion/preamble to select); (3) one or more additional PRACH occasions, for example along with an association to certain SSBs/CSI-RSs; and/or (4) a time offset to one or more applicable dynamic PRACH occasions, among others.

In certain representative embodiments, the indication may be explicit (e.g., based on a content of the trigger signal 210 and/or properties of the trigger signal 210). In other representative embodiments, the indication may be determined by the WTRU 102 implicitly from: (1) the trigger signal 210, (2) the sequence of the SSB and/or CSI-RS transmissions, and/or (3) other gNB transmissions.

The WTRU 102 may determine that a certain SSB or certain SSBs were not transmitted or were transmitted with a timing offset with respect to the configured SSB transmission occasion, for example due to an LBT failure (e.g., LBT operation failure) at the network entity (e.g., the gNB). The WTRU 102 may change (e.g., then change) the association rule of mapping PRACH occasions and/or preambles to the SSBs.

For example, the WTRU 102 may determine that the PRACH occasions and/or preambles associated with missing SSBs (and/or CSI-RS) no longer indicate the missing SSBs. The WTRU 102 may further re-use the PRACH occasions/preambles associated with the one or more SSBs not transmitted before the timing of these PRACH occasions for a different purpose and/or for a different indication. For example, the WTRU 102 may use these PRACH resources for an indication of other SSBs that were transmitted.

For preamble retransmissions, the WTRU 102 may determine to wait (e.g., that the WTRU 102 is to wait) for the next PRACH occasion when the SSB selected for the initial transmission was missing due to the LBT failure on that SSB prior to the preamble retransmission. For example, it may be useful for the WTRU 102 to not change SSBs for a preamble retransmission when the previously selected SSB was not transmitted due to the LBT (e.g., an LBT failure occurred), even though other SSBs are available and/or the LBT operation was successful for other SSBs, for example to maintain progress of the power ramping status for the previously selected beam. In such a case, the WTRU 102 may not increment the power ramping counter and/or the preamble transmission counter when an associated PRACH occasion is skipped. The WTRU 102 may skip or further skip RACH occasions associated with the SSB selected with the previous PRACH transmission, for example up to a limited number of retransmissions or while a certain timer is running (e.g., which may be configured by higher layers and/or via network signaling).

In certain representative embodiment, for preamble retransmissions in a beamformed NR-U cell, the WTRU 102 may determine that the WTRU 102 may select a PRACH occasion/preamble associated with the SSB selected for an initial and/or a preceding transmission, even though a current SSB transmission is missing due to an LBT failure. The WTRU 102 may determine from an indication by the network that a specific SSB was not transmitted (e.g. due to the LBT failure), or the WTRU 102 may autonomously determine that an SSB was not transmitted (e.g., due to the LBT failure). The WTRU 102 may follow or further follow such behavior, for example up to a limited number of retransmissions or while a certain timer is running (which may be configured by higher layers and/or via network signaling).

Representative WTRU Behavior for Receiving Trigger Signal

A WTRU 102 may begin monitoring for a PRACH resource trigger signal after or upon determining that the WTRU 102 is to transmit or is being triggered to transmit a PRACH preamble 210. The WTRU 102 may be configured with a monitoring pattern to detect a PRACH resource trigger signal. The configuration may be provided in a broadcast channel and/or may be RRC configured. Upon or after reception of the PRACH resource trigger signal, the WTRU 102 may attempt to transmit a PRACH preamble in the associated PRACH resource. In a first example, receiving the indication may enable the WTRU 102 to use multiple PRACH resources, for example for PRACH retransmissions. In another example, the WTRU 102 may receive a different PRACH resource trigger signal for PRACH resources (e.g., every PRACH resource) used for preamble retransmission.

The trigger signal may be received from a PDCCH monitored in a common and/or WTRU-specific search space. The RNTI, used to mask a Cyclic Redundancy Check (CRC) of the PDCCH, may be pre-determined or configured by higher layers, for example as part of system information. The RNTI may, in addition to or in lieu of being configured as part of system information, may be configured, for example, by dedicated signaling, or may correspond to a Cell-RNTI (C-RNTI). Allowing multiple RNTIs (e.g., one provided by system information and a second corresponding to a C-RNTI) may allow the network to flexibly configure the resource or resources for any of: contention-based RA and/or for contention-free RA.

Representative Triggering by RAR

In certain representative embodiments, upon needing and/or desiring to perform a RA procedure, a WTRU 102 may begin to monitor pre-configured search spaces to attempt to receive a gNB triggered RAR. The RAR may be transmitted by the gNB, for example without having first received a preamble transmission. For example, a WTRU 102 may monitor a search space to receive control signaling indicating that an unprompted RAR is being transmitted. The RAR may provide one or more WTRUs 102 with one or more UL grants to perform a msg3 transmission along with applicable transmission properties, including one or more applicable LBT configurations.

The WTRU 102 may receive an RAR that includes an identifier which may identify one or more WTRUs 102 for which the RAR and/or UL grants are valid. The RAR may include the RA purposes, as described herein, for which the indicated UL grants may be used.

The RAR may include a set of grants. A WTRU 102, for example determining, desiring, and/or needing to perform RA, may select a grant from the set of UL grants. The selection of the grant may be random (e.g., completely random). In another example, the selection of the grant may depend on any of: (1) an anticipated Timing Advance (TA) range (for example, a WTRU 102 may select a grant based on an anticipated range of TA values); (2) a RA-RNTI; (3) a RA Preamble ID; (4) a Service type; (5) UL and/or DL beams (for example, based on measurements on a DL RS, for example the WTRU 102 may have a preferred UL beam and/or a preferred DL beam); (6) an amount of data to transmit; (7) a RA purpose; and/or (8) a previously failed msg3 transmission (for example, if a previous UL grant transmission failed, the WTRU 102 may select a more robust UL grant for a next attempt at RA, among others.

Representative Operations for Reducing the Number of LBTs per RA Procedure

Single LBT-RA Procedure

To reduce the number of LBTs used or required for each message transmission in a single RA procedure, COT sharing with one or multiple switching points may be used to share channel access between the WTRU 102 and the network entity (e.g., gNB 180). COT sharing may be implemented (e.g., considered) when UL and DL RA messages are transmitted on the same channel, in time-duplex frame structures for example.

For example, upon acquiring the channel to transmit a Message (e.g., Message 2 (msg2)), the gNB 180 may keep occupying the channel until the gNB 180 transmits Message 4 (msg 4). The gNB 180 may signal or imply (for example based on indicated parameters in a Message or the Message itself) a COT switching point along with an LBT configuration per the provided grant for the msg3 transmission and may stop occupying the channel during the grant PUSCH duration. The WTRU 102 may or may not perform a short LBT prior to the transmission of the msg3, which, for example may result in reducing the number of LBTs and/or the number of full LBTs per RA procedure, where each transceiver may acquire the channel for a limited number of times (e.g., only once). Similarly, the WTRU 102 may hold the channel after transmitting the msg3 until the WTRU 102 receives another grant for Message 5 (msg5). In certain representative embodiments, short LBT operations may listen for a shorter period or may determine that the channel is available based on more relaxed criteria than long LBT operations.

Representative Adjustment of RAR and/or Contention Resolution Timers

The WTRU 102 may monitor the PDCCH during a time period prior to expiration of one or more timers (e.g., ra-ResponseWindow) and/or (e.g., ra-ContentionResolution Timer). For example, if timer ra-ResponseWindow expires without the WTRU 102 receiving msg2 or if ra-ContentionResolution Timer expires without receiving msg4, the WTRU 102 may determine that a preamble retransmission is appropriate (e.g., assume a preamble retransmission is needed.) For NR-U, the PDCCH may have been not transmitted for msg2 and/or msg4 due to the failure of the gNB 180 to acquire the channel after an LBT. In such case, the WTRU 102 may benefit from extending a wait time for msg2 and/or msg4 to complete the RA procedure prior to attempting another preamble retransmission.

The WTRU 102 may be able to determine that the gNB 180 did not acquire the channel for transmission of the PDCCH for msg2 and/or msg4. The WTRU 102 may take some actions (e.g., useful and/or necessary actions) to extend the PDCCH monitoring period, including any of: (1) the WTRU 102 may pause the timers ra-ResponseWindow and/or ra-ContentionResolution Timer during the period the WTRU 102 determines that the channel is busy and/or that the gNB 180 did not acquire the channel; (2) the WTRU 102 may reset the timers ra-ResponseWindow and/or ra-ContentionResolution Timer (for example once the WTRU 102 determines that the channel is busy and/or that the gNB 180 did not acquire the channel); and/or (3) the WTRU 102 may add time values to any of the timers ra-ResponseWindow and/or ra-ContentionResolution Timer (for example once the WTRU 102 determines that the channel is busy and/or that the gNB 180 did not acquire the channel). The added time value or values may be dependent on a configured value and/or may be based on a duration during which the channel was determined to be busy. The added value or values may be randomly determined by the WTRU 102 from a set of possible values.

Representative Message 1/2/3/4 Diversity

In certain representative embodiments, transmission of multiple messages (e.g., msg1, msg2, msg3, and/or msg4) on different resources and/or, for example, in different sub-bands may be implemented and may be beneficial (e.g., each message may be associated with its own LBT procedure). For example, in high channel occupancy conditions when more than one RAT may share the channel, acquiring a wideband channel with wideband LBT to transmit a single message may not be efficient, for example based on the OCB requirement (e.g., when considering the OCB requirement). PRACH preamble, RAR, msg3 and/or msg4 diversity may be achieved by attempting to transmit these messages in a set of different resources and/or LBT sub-bands, each resource may use and/or require an independent LBT. This diversity may provide robustness against failure to acquire a channel in one or more LBT sub-bands. The WTRU may attempt such transmission/reception diversity dependent on the preamble retransmission number and/or a RRC configuration, and/or any of the following: (1) a preamble attempt number and/or the preamble transmission number; (2) indices of the UL and DL BWPs, and/or a linkage between or among the UL and DL BWPs (e.g., if configured and/or if valid); (3) whether a timer (e.g., a BWP inactivity timer) is running or is expired; (4) observed channel occupancy/load conditions on monitored sub-bands/BWPs; (5) a certain static or semi-static configuration, (e.g., received via RRC and/or SI signaling) for the WTRU or the applicable PRACH resource; and/or (6) a capability of the WTRU 102 to support multiple active BWPs, among others.

For example, the WTRU 102 may be configured to attempt to transmit multiple msg1s using different sub-bands, PRACH resources, preambles, and/or interlaces. For msg2 and/or msg4, the WTRU 102 may be configured to attempt to receive at least one RAR/contention resolution on different sub-bands, coresets, and/or BWPs.

For msg3, the WTRU 102 may receive multiple grants to transmit msg3. For example, the WTRU may receive a Msg2 PDU containing or including multiple MAC RARs for the same preamble ID (e.g., each containing or including a different uplink grant) or an enhanced MAC RAR that may contain or include multiple UL grants. The WTRU 102 may transmit one or multiple messages (e.g., msg3s) depending on the LBT outcome for the grants (e.g., each grant), e.g., on a single UL grant for which an LBT was successful. For example, the WTRU 102 may receive multiple grants in msg2 for msg3 transmission on different sub-bands. The WTRU 102 may apply a separate LBT procedure for each selected grant for the msg3. In another example, the WTRU 102 may receive multiple grants in msg2 for the msg3 transmission on the same sub-band. The WTRU 102 may apply a single LBT procedure and transmit the multiple msg3s. In a further example, a WTRU 102 may receive one or more msg2s, each msg2 including (e.g., with) one or more UL grants for msg3 (for example each msg2 may point to one or more different msg3 grants). The WTRU 102 may transmit a single msg3 on any one or a subset of the available resources (e.g., channel resources) associated with the provided msg3 grants. The availability, for example of the channel resources may be determined from the outcome of the LBT procedure.

Representative LBT Procedure for PRACH transmission

PRACH preamble selection may enable multiplexing of PRACH transmissions on the same PRACH resources by a set of WTRUs 102. It is contemplated that WTRUs 102 may not be time aligned when transmitting PRACH. In such a case, an early PRACH preamble transmission by a first WTRU 102a may lead to a failed LBT by a second WTRU 102b. An LBT procedure for PRACH transmission may be modified to reduce and/or substantially eliminate such blocking. In a first representative procedure, an interference threshold, used in the clear channel assessment part of LBT, may be set to a different value for PRACH transmission than for other UL and/or DL transmissions.

In certain representative procedures, the interference threshold, used for clear channel assessment, may vary over a course of the LBT procedure. For example, a WTRU 102 may determine and/or may need to determine N CCA slots where the channel is free. For a set of CCA slots closest in time to the transmission of PRACH, the WTRU 102 may use an interference measurement threshold value that may be different (e.g., that may be higher) than for other CCA slots in the LBT procedure, for example, which may enable a WTRU 102 to avoid determining that a CCA slot is busy, when the slot is, for example used by one or more other WTRUs 102 with different timing alignments.

In certain representative procedures, a WTRU 102 may use a timing offset between an end of an LBT process/procedure and the timing of a UL transmission. Any LBT process/procedure that has not been determined to be successful prior to the time determined by the offset and the timing of the UL transmission may be deemed failed and it may be determined that no transmission may occur (e.g. for that UL resource).

In certain representative procedures, the WTRU 102 may use a previously obtained TA value to adjust a length of the CCA window/LBT process/procedure, the start time of the CCA, and/or the start timing of an uplink transmission. The WTRU 102 may determine whether a TA value is valid based on a mobility status. The WTRU 102 may estimate (e.g., based on certain cell configuration and/or downlink measurements) a TA value to adjust the start and/or length of the CCA or the start of the actual uplink transmission.

In certain representative procedures, a WTRU 102 may use a shortened LBT process/procedure for one or more transmissions that may be multiplexed with other WTRUs 102. The shortened LBT process/procedure may use or require a WTRU 102 to determine a smaller amount of N CCA clear CCA slots and for a remainder of the LBT, the WTRU 102 may disregard measurements on the CCA slots, and may include their duration in an overall differ time.

Use of an Alternative LBT Procedure May Enable WTRU Multiplexing

The LBT type (e.g. using a set of thresholds, along with the set of CCA slots for which each threshold is applicable, using a shortened LBT process/procedure, using an offset between the end of the LBT process and the UL transmission, or access class category) may be determined as a function of an UL transmission type and/or resources. This may enable multiplexing of different UL transmissions. For example, a WTRU 102 may be granted UL resources in the same slot and/or set of symbols, as a PRACH resource. In such a case for an UL transmission (e.g. granted, and/or configured), a WTRU 102 may use an LBT configuration that includes or indicates variable CCA thresholds, and/or timing offset between an end of LBT and the beginning of the transmission.

The WTRU 102 may determine that a UL transmission may be transmitted in the same slot and/or symbols as another UL transmission from another WTRU 102. Depending on whether the WTRU 102 expects other WTRUs transmitting simultaneously to be time aligned or not, the WTRU may use a different LBT process/procedure (and/or LBT parameters). For example, if a WTRU 102 is transmitting in resources that may overlap or actually overlap a PRACH resource, the WTRU 102 may use a first set of LBT parameters. If the WTRU 102 is transmitting in resources that cannot overlap PRACH resources, the WTRU 102 may use a second set of LBT parameters.

A WTRU 102 may determine the type of LBT procedure, along with the parameters (e.g., the set of threshold values and associated CCA slots) associated therewith, for example based on the access class priority of a transmission.

A WTRU 102 may indicate a presence, or lack thereof, of a UL transmission in an adjacent slot occurring prior to (e.g., immediately prior to) the UL resources (e.g., resources for the PRACH, the PUSCH, and/or the PUCCH and the like) of the WTRU 102, for example which may enable the WTRU 102 to use a different LBT type and/or different parameters associated to the WTRU 102. For example, for the case where it is indicated that another WTRU 102 (e.g. another WTRU 102 served by the same gNB 180) is transmitting in resources immediately prior to the UL resources of the WTRU 102, the WTRU 102 may use an LBT procedure using or requiring less clear channel assessment time. Timing may be indicated when such an LBT procedure may be or is to be performed. For example, the timing of the LBT procedure may be multiple slots prior to an actual transmission.

Representative Interlaced Transmissions

OFDM based interlacing for UL transmissions may be used, for example in unlicensed spectrum to improve a capacity of the UL. The PUSCH and PRACH channels (e.g. from a same WTRU 102 or from different WTRUs 102) may be interlaced, independently and/or dependently. The WTRU 102 may interlace a PUSCH and/or PRACH in a number of ways, for example based on: (1) a network configuration, (2) received network signaling, and/or (3) pre-set rules, among other. The network signaling may be dynamic (e.g., using L1/L2 signaling), semi-static (e.g., using L2/L3 signaling) and/or preset. For example, the WTRU 102 may use any of the following procedures in which:

(1) the PUSCH is interlaced and the PRACH is not interlaced: (for example, PRACH signals may be transmitted contiguously in the frequency domain (e.g., between other PUSCH interlaces, or in resources contained or included in PRBs located in a gap between two portions (e.g. PRBs) of a PUSCH interlace). In other representative embodiments, the PRACH may be transmitted in contiguous PRBs, that may be interrupted by one or more PRBs used for PUSCH interlace);

(2) in which PUSCH and PRACH are transmitted using different interlaces: (for example, PRACH and PUSCH channels (e.g., from a same WTRU 102 or from different WTRUs 102) may both be interlaced. The WTRU 102 may determine an interlacing pattern for each channel. The WTRU 102 may determine a PRACH interlace from a PUSCH interlacing pattern. The WTRU 102 may indicate one or more possible associations between the PRACH and PUSCH interlaces. For example, the PRACH interlace and/or preamble may be tied to a specific PUSCH interlace. In another example, the WTRU 102 may determine from a function (e.g., using a WTRU ID as an input), the linkage of the PRACH and PUSCH interlaces); and/or (3) the PUSCH and the PRACH are transmitted using a single interlace (e.g. for when the PRACH and PUSCH transmissions are desired for a single WTRU 102. For example, the PRACH sequence may be combined with the PUSCH data before mapping information to subcarriers/PRBs of an interlace. The WTRU 102 may apply certain remapping of the combined PRACH/PUSCH sequence prior to mapping to physical resources), among others.

For a 2-step RACH operation, a single WTRU 102 may transmit and/or may need to transmit both the PUSCH and the PRACH for a combined first RACH message (eMsg1 or combined Msg1). The WTRU 102 may transmit on both channels simultaneously or non-simultaneously, based on an association between the used PRACH resource/preamble and the corresponding PUSCH used to carry the data payload. The WTRU 102 may consider any of the following to determine whether to transmit both channels simultaneously or non-simultaneously: (1) the power headroom and/or uplink transmit power of the WTRU 102; (2) the channel occupancy conditions and/or a remaining time in the COT; (3) the preamble retransmission number; (4) reception on network signaling including, for example the RACH trigger signal and/or (5) the purpose or the type of the RA.

For example, the WTRU 102 may select the resource for data to occur in the first available UL resource for transmission of data which follows transmission of the preamble, and such resources may be provided to the WTRU 102 through network signaling. The PUSCH interlace and PRBs selected by the WTRU 102 to transmit the data payload part of the eMsg1 may be selected per any of the procedures described below.

When the eMsg1 is transmitted in a NR-U cell, the WTRU 102 may set, determine, and/or assume an association between a selected PRACH resource and a PUSCH interlace (in additional to other PUSCH resource properties). The WTRU 102 may determine the PUSCH interlace (in additional to other PUSCH resource properties) associated with the selected PRACH using any of the following:

(1) a fixed or predefined procedure, such that the procedure is preconfigured in the WTRU 102 and is assumed/set for all WTRUs 102; For example, the WTRU 102 may select an interlace based on its WTRU identity.

(2) from information provided in system information, such as through a broadcast on SIBs or provided in an access table;

(3) based on explicit an indication, such as explicitly indicated in a DCI, or in a downlink control message (e.g., a MAC CE message and/or an RRC message, among others);

(4) based on a selected preamble (e.g., the selected preamble may be associated with a specific interlace to be used. An association may be fixed or configured by the network);

(5) based on the selected PRACH resource (e.g., a PRACH resource may be associated with a specific interlace to be used. The association may be fixed or configured by the network);

(6) based on a random selection (e.g., the WTRU 102 may select from a set of possible PUSCH interlaces. The number of possible interlaces usable by the WTRU 102 may be further determined by any of the representative procedures/processes/methods described above and herein).

Representative RA Procedures in Unlicensed Spectrum
Representative Backoff Procedures FIG. 3 is a diagram illustrating a representative backoff procedure used with LBT operations (e.g., a random backoff applied by the WTRU 102 after an LBT failure).

Referring to FIG. 3, the RA procedure 300 may include a first WTRU 102a that may desire to initiate a RA procedure and that may initiate an LBT operation 330a. The first WTRU 102a may determine that a channel is busy (e.g., during a channel busy period 315) and may start a first backoff timer. A value of the first backoff timer may be set, for example randomly, or based on a RA priority. Later, a second WTRU 102 may desire to initiate a RA procedure and may initiate an LBT operation 330b. The second WTRU 102b may determine that the channel is busy (e.g., during a channel busy period 315) and may start a second backoff timer. The second backoff timer may expire prior to the expiry of the first backoff timer and the second WTRU 102b may initiate its second LBT operation 340b. Since the channel is now available, the second WTRU 102b may send its RA preamble 320b. The first backoff timer may then expire (e.g., after expiry of the first backoff timer) and the first WTRU 102a may initiate its second LBT operation 340a. Depending on the timing, the channel may be available (e.g., the second WTRU 102b may not yet have acquired the channel). If so, the first WTRU 102a may send its RA preamble 320a. If the channel is not available (not shown), for example because the second WTRU acquired the channel, the first WTRU 102a may start another backoff timer.

In certain representative embodiments, when a channel is busy for an extended duration, there may be a higher probability of collision on a RACH when the channel becomes available again, since a large number of WTRUs 102 may desire to or are to perform RA procedures. When a preamble collision happens and the gNB 180 fails to acquire the channel due to an LBT (e.g., due to an LBT failure), the gNB 180 does not have the opportunity to signal a backoff value for the colliding WTRUs 102. In a scenario where multiple WTRUs 102 are attempting an RA procedure in an NR-U cell where the DL channel is occupied, the WTRUs 102 may continue to simultaneously retransmit preambles on the UL channel without backoff. Representative backoff procedures to mitigate such collisions and retransmission are described herein.

A WTRU 102 may perform an LBT operation prior to transmitting a first preamble and may determine that the channel is not available.

Following transmission of a preamble, a WTRU 102 may determine that an RAR was not transmitted by the gNB 180 due to an LBT failure (e.g., that the channel is not available). The determination may be based, for example, on any of:

(1) the WTRU 102 detecting others that have acquired the channel (based on e.g., sensing, for example transmissions with certain properties that may indicate (e.g., implicitly indicate) one or more transmitters other than gNB 180 acquired the channel);

(2) the WTRU 102 detecting noise above a threshold over or for a relevant resource; and/or (3) The WTRU 102 not detecting transmissions with certain properties (e.g., that may indicate (e.g., implicitly indicate) that the gNB 180 acquired the channel and transmitted), such as a PDCCH, among others.

In the above, the detection may take place while an RAR timer is running, and/or when the RAR timer is expiring.

In certain representative embodiments, the WTRU 102 may subsequently start a backoff timer. The backoff timer may be started when (e.g., while) the WTRU 102 detects that the channel is available, and may be suspended when (e.g., while) the WTRU 102 detects that the channel is not available. In certain representative embodiments, the backoff timer may be started immediately.

The WTRU 102 may receive a Trigger Signal, as described herein. Upon reception of the Trigger Signal the WTRU 102 may stop any on-going backoff timer and/or may start a new backoff timer.

The value of the backoff timer may be selected randomly between a minimum value and a maximum value. The minimum value and/or the maximum value may be pre-determined, configured statically, configured semi-statically and/or signaled, for example. The minimum value and/or the maximum value may depend on any of: (1) the sub-band on which the preamble was transmitted, (2) the preamble transmission attempt number, (3) the preamble transmission counter value, (4) channel loading conditions, (5) the duration of the period during which the channel was not available since the last preamble transmission, (6) whether the WTRU 102 received a Trigger Signal (e.g., the minimum and maximum values may further depend on a property of the Trigger Signal, or may be explicitly indicated as part of information carried by the Trigger Signal), (7) a priority of the logical Channel (LCH) that triggered the RA (for example in connected mode), and/or (8) whether the RA is considered a prioritized RA, including the RA priority, among others.

The WTRU 102 may adjust (e.g., further adjust, pause and/or stop) the backoff timer if the WTRU 102 determines that the channel is busy and/or that the gNB 180 did not acquire the channel, for example due to the LBT. For example, the WTRU 102 may suspend the running backoff timer, may reset the timer, or may adjust a value of the timer, for example if the WTRU 102 determines that the gNB 180 could not or did not acquire the DL or UL channel due to the LBT.

Upon expiry of the backoff timer, the WTRU 102 may perform a preamble retransmission.

In another example, the WTRU 102 may determine that the RAR was not sent due to the preamble not being decoded and/or received by the gNB 180 (e.g., rather than based on the LBT) and the WTRU 102 may perform a preamble retransmission without backoff.

In certain representative embodiments, the gNB 180 may indicate a backoff value in the RAR that is applicable to a particular sub-band or sub-bands, which may be different than the sub-band on which the RAR with the backoff indication was received.

In certain representative embodiments, in which the backoff timers for multiple WTRUs 102 expire and a channel remains busy, the WTRUs 102 may apply a further backoff (e.g., start another random backoff timer), for example when the channel becomes available. This may be beneficial to prevent numerous WTRUs 102 from attempting to access the channel simultaneously when the channel becomes available. The further backoff or an indication to apply a further backoff may be: (1) signaled by the gNB 180 upon channel availability, (2) semi-statically configured, and/or (3) statically configured, among others.

Representative Msg1 Resource Selection Procedure

The WTRU 102 may maintain (e.g., further maintain) a preamble attempt counter, which may be incremented each time the MAC instructs the PHY to transmit a preamble regardless of the outcome of the LBT, or each time a preamble transmission attempt fails LBT. The WTRU may determine the number of attempts that failed LBT directly from the counter value, or from the difference between the preamble transmission counter and the preamble attempt counter.

The WTRU 102 may fail to acquire the channel for a preamble transmission in Msg1, or may fail to receive an RAR after a successful LBT for preamble transmission. The WTRU 102 may attempt to transmit or retransmit the msg1 on a different sub-band, LBT bandwidth, interlace, and/or preamble/PRACH occasion. Such channel switching may depend on any of the following: (1) the preamble retransmission number being larger than a configured threshold; (2) the preamble attempt number being larger than a configured threshold; (3) the indices of the UL and DL BWPs, and/or a linkage between or among UL and DL BWPs (e.g., if configured and/or if valid); (4) whether a timer (e.g., the BWP inactivity timer or a timer to reset the preamble attempt counter) is running or is expired; (5) the observed channel occupancy/load conditions on monitored sub-bands/BWPs; (6) a certain static or semi-static configuration, e.g., by the RRC or the SI; and/or (7) the capability of the WTRU 102 to support multiple active BWPs, among others.

For example, the WTRU 102 may be configured to attempt to transmit or retransmit a preamble (or initiate another RA procedure) on a different sub-band or LBT channel compared to a previous attempt, for example if the preamble attempt counter is above a certain configured number. The WTRU 102 may report a problem to higher layers (e.g., notify the RRC and/or trigger RLF). For example, the WTRU 102 may trigger RLF after attempting a number of preamble transmission attempts (that failed the LBT) on a number of LBT sub-bands (e.g. all subbands in the active BWP or a subband on each BWP). In another example, the WTRU 102 may attempt to transmit or retransmit a preamble on a different sub-band if the BWP inactivity timer is about to expire or has expired.

The WTRU 102 may attempt to transmit or retransmit a preamble on the UL BWP that has the same index as the DL BWP that was active prior to initiating a RA, which may involve or include switching an active UL BWP, which may be beneficial in the context of NR-U (e.g., when the active DL BWP of the WTRU 102 has less load/channel occupancy than the DL BWP of the same index as the active UL BWP prior to initiating the RA). This may be in contrast with a behavior in NR licensed, where upon initiating a RA, the WTRU 102 may switch the active DL BWP of the WTRU 102 to the DL BWP with the same index as the active UL BWP.

Upon switching to a different sub-band and/or BWP for a preamble transmission attempt, the WTRU 102 may stop the ongoing RA procedure and may restart a new procedure on the new sub-band and/or BWP. In one example, the WTRU 102 may continue an ongoing RA procedure after changing the sub-bands and/or the BWPs, if the PHY (e.g., PHY layer) has not transmitted any preambles since the start of the procedure. The WTRU 102 may reset the preamble attempt counter upon and/or after switching BWPs/sub-bands, e.g., if the RA procedure is not reset. The WTRU may further reset the preamble attempt counter upon expiry of a related reset timer configured by RRC.

Since the outcome of the LBT may not be known to the Media Access Control (MAC), the MAC may not be aware if PHY has transmitted the PRACH physical signal and the MAC may increment preamble_transmission_counter counter (e.g., once the RAR and/or the contention resolution were not received and PHY indicates that a preamble was transmitted after a successful LBT).

The WTRU 102 may start the ra-ResponseWindow after the PHY indicates to the MAC that the preamble was transmitted by the PHY and the LBT was successful. This may be beneficial, for example to avoid unnecessary PDCCH monitoring when no preamble was actually transmitted in PHY (e.g., the physical layer).

The MAC may take into account and/or use the LBT outcome for preamble retransmission prior to changing preamble_power_ramping_counter. For example, the MAC may increment preamble_power_ramping_counter upon at least any of the following occurring: (1) the RAR and/or contention resolution were not received for the previous preamble transmission; (2) the MAC selects a preamble for retransmission on the same UL/DL channel used in the previous preamble transmission; and/or (3) the PHY indicates that a preamble was transmitted after a successful LBT, among others.

For a PRACH selection in NR-U access, the WTRU 102 may calculate the RA-RNTI based on the PRACH resource selected. The WTRU 102 may include information on the selected PRACH interlace part of the RA-RNTI computation. For example: (1) f_id may be defined/extended as a function of the selected interlace; and/or (2) the formula may take into account the selected interlace ID directly.

Representative RAR Reception Procedure

In certain representative embodiments, a WTRU 102 may expect the RAR to be transmitted on any of a set of sub-bands, interlaces, or sets of resources. The WTRU 102 may monitor a set of control resource sets (e.g., an RAR monitoring set). The set of control resource sets may span multiple sub-bands and may enable the reception of the RAR on multiple sub-bands (e.g. to enable greater probability of successful channel access for the transmission of the RAR by the gNB 180). The control resource sets within the RAR monitoring set may have (e.g., each have) a different periodicity and offset. The RAR monitoring set may be determined based on a broadcasted channel (e.g., including the MIB and/or the SIBs). In certain representative embodiments, the RAR monitoring set may be determined based on the selected PRACH preamble and/or the PRACH resource.

The RAR (or the RAR MAC CE) may include an indication regarding one or more sub-bands and/or one or more Bandwidth Parts (BWPs) on which the preamble was received. For example, the indicated sub-band may refer to any sub-band and/or BWP within the cell. The indication may be useful when a linkage between UL and DL BWPs is not contemplated/assumed (when the indices of the UL BWP and the DL BWP do not match for example). The RAR (or the RAR MAC CE) may include an indication regarding a cell on which the preamble was received.

The WTRU 102 may monitor for the RAR on multiple SSBs or CSI-RSs. For example, if the selected PRACH preamble and/or resource is associated with more than one SSB (or more than one CSI-RS), the WTRU 102 may monitor for the RAR on SSBs (e.g., all SSBs) associated with the selected PRACH preamble/resource.

Representative RA Prioritization Procedure

A prioritized RA procedure in NR-U access may use a differentiated LBT window and/or configuration relative to the non-differentiated RA. The WTRU 102 may apply a different LBT window and/or configuration depending on, for example the RA priority.

The WTRU 102 may determine and/or consider the number of preamble transmissions and/or retransmissions attempts prior to the current attempt, when applying a specific value for the LBT window and/or configuration. The WTRU 102 may determine and/or consider the sub-band on which the WTRU 102 is attempting to transmit a preamble when applying a specific value for the LBT window and/or configuration. For example, the specific value for the LBT window and/or configuration may be based on: (1) the number of preamble transmissions and/or attempts; and/or (2) the sub-band on which the WTRU 102 is attempting to transmit the preamble, among others.

Representative Scheduling Request (SR) in Unlicensed Spectrum

Representative LBT Effect on PUCCH Transmission

The WTRU 102 may be configured with PUCCH resources (e.g., for transmitting a scheduling request or other UCI on the PUCCH. The PUCCH resources may include any of: (1) one or more time resources (e.g. set of symbols), (2) one or more frequency resources (e.g. set of PRBs), (3) one or more precoders (e.g., an analog/digital/hybrid precoder (e.g. for a transmit beam), (4) one or more cover codes (e.g. to enable orthogonal or non-orthogonal multiple access), (5) an interlace pattern (e.g. a subset of subcarriers and/or PRBs on which to transmit) and/or (6) a LBT configuration. The LBT configuration may be received by the WTRU 102 in a broadcast, multicast or unicast transmission. The LBT configuration may be included in or indicated in the received transmission. For example, the LBT configuration may be an indication, which may be semi-static set (e.g., set over a period more than one TTI, slot or mini-slot period) and/or dynamically set (e.g., each TTI, slot or mini-slot period).

Representative LBT Configuration per SR Configuration

To perform SR transmission on PUCCH resources, for example, the WTRU 102 may perform LBT prior to such transmission on the resources (e.g., configured PUCCH resources). The WTRU 102 may use the LBT configuration tied to the transmission of the SR configuration. For example, a WTRU 102 may have a specific LBT configuration (e.g., an LBT type, a duration, and/or a set of parameters, among others) that may be applicable to (e.g., only to) the transmission of a SR, or for example unique to a given SR configuration, a LCH, or a Logical Channel Group (LCG). For example, the WTRU 102 may be configured (e.g., by the RRC) with a mapping between or among the SR configurations and the LBT configurations (and/or the LBT access class priority). In another example, the WTRU 102 may apply the LBT configuration configured for the LCH that triggered the SR prior to the PUCCH transmission.

Representative Procedure for Triggered PUCCH Opportunities

In certain representative embodiments, a WTRU 102 may perform a transmission of a SR (and/or other UCI) on a PUCCH resource or resources, if the WTRU 102 received a trigger signal (sometimes referred to as a "PUCCH transmission trigger"). The PUCCH transmission trigger and its contents may be similar to the trigger signal described herein for a PRACH. For example, the PUCCH transmission trigger may consist of or may include a DCI received in the PDCCH, in a common space and/or in WTRU-specific search space. The PUCCH transmission trigger may indicate any of: (1) a type of UCI to be transmitted, such as a SR and/or a HARQ-ACK, (2) an index to a valid resource or resources and/or (3) a transmission time, among others. For example, the WTRU 102 may expect to receive a signal that may indicate an upcoming PUCCH resource is valid. Reception of the signal/indication may affect the type of LBT (and/or the LBT parameters) to be used for the PUCCH resource or resources. For example, for a PUCCH resource for which a WTRU 102 did not receive a PUCCH transmission trigger, a WTRU 102 may use full LBT before transmitting a SR or other UCI on the PUCCH. For a PUCCH resource or resources for which a WTRU 102 received a PUCCH transmission trigger, the WTRU 102 may use (1) a higher priority LBT (e.g. an LBT configuration in which parameters are relaxed to increase a likelihood of channel acquisition); or (2) no LBT (e.g., no LBT at all).

It is contemplated that the representative Trigger Signal (and its content), which are described herein, may be equally applied to (e.g., used for) PUCCH resources and/or PRACH resources.

In some representative embodiments, the WTRU 102 may be allowed (e.g., may only be allowed) to transmit the SR on a configured PUCCH resource if or on condition that the WTRU 102 received a PUCCH transmission trigger indicating that the PUCCH resource is valid.

In some representative embodiments, a WTRU 102 may be allowed to transmit a SR on any of a first PUCCH resource (e.g., a periodic resource), and/or on a second PUCCH resources indicated by a PUCCH transmission trigger. These representative embodiments may improve latency of SR transmission in scenarios where a large fraction of periodic PUCCH opportunities for SR are lost due to high channel occupancy. The first and second PUCCH resources may be selected from a first and second set of PUCCH resources configured by the RRC and/or the MAC. For example, the first set of PUCCH resources may correspond to a first PUCCH resource index (e.g., occurring periodically), and the second set of PUCCH resources may correspond to a second PUCCH resource index (e.g., with a timing indicated by the PUCCH transmission trigger).

Representative WTRU Behavior for Receiving a Trigger Signal

A WTRU 102 may begin monitoring for a PUCCH resource trigger signal upon and/or after triggering a SR, and/or upon and/or after determining that the WTRU 102 is to or needs to send UCI on the PUCCH. The WTRU 102 may be configured with a monitoring pattern to detect a PUCCH trigger signal. The configuration may be provided in a broadcast channel and/or may be RRC configured. Upon reception of the trigger signal, the WTRU 102 may attempt to transmit a SR on the associated PUCCH resource or resources. For example, receiving such an indication (e.g., the trigger signal) may enable the WTRU 102 to use multiple PUCCH resources and/or SR configurations.

Representative SR Procedure in Unlicensed Spectrum

Representative SR Procedure

Since the outcome of an LBT may not be known to the MAC (e.g., the MAC layer), the MAC may not be aware if the PHY has transmitted a SR. The MAC may increment a SR_Counter for the applicable SR configuration once and/or after the PHY (e.g., physical layer) indicates that SR was transmitted after a successful LBT. The WTRU 102 may start a sr-ProhibitTimer and may monitor the PDCCH once and/or after the PHY indicates to the MAC that the SR was transmitted by the PHY and the LBT was successful. This representative procedure may be beneficial, for example, to avoid unnecessary PDCCH monitoring when no SR was actually transmitted in the PHY.

The WTRU 102 may maintain (e.g., further maintain) a SR attempt counter, which may be incremented when (e.g., each time) the MAC instructs the PHY to send a SR regardless of the outcome of an LBT, or each time a SR transmission attempt fails LBT. Once and/or after the SR attempt counter reaches a certain number of SR attempts (e.g., a threshold level), the WTRU 102 may perform any of the following: (1) retransmit the SR and/or switch to a different interlace, sub-band, BWP, cell, and/or with other PHY characteristic; (2) initiate a RA procedure on a given cell; (3) report a problem to higher layers (e.g., notify the RRC and/or trigger RLF); and/or (4) change the LBT configuration used, among others.

Representative Procedure for PUCCH Resource Selection

The WTRU 102 may fail to acquire a channel for a SR transmission, and/or may fail to receive a PDCCH after a successful LBT for a SR transmission. The WTRU 102 may attempt to transmit or retransmit the SR or RA-SR on a different sub-band, a different interlace, and/or a different cell. This channel switching may depend on any of the following: (1) the SR retransmission number being larger than a configured threshold; (2) the SR attempt number being larger than a configured threshold; (3) the indices of the UL and DL BWPs, and/or the linkage between or among UL and DL BWPs (e.g., if configured and/or valid); (4) whether a timer (e.g., a BWP inactivity timer or a timer to reset the SR attempt counter) is running or is expired; (5) observed channel occupancy/load conditions on monitored sub-bands/BWPs; (6) a certain static or semi-static configuration, e.g., by RRC or SI; and/or (7) the capability of the WTRU 102 to support multiple active BWPs, among others.

For a WTRU 102 capable of multiple active BWPs, the WTRU 102 may transmit a SR (e.g., further transmit another SR) on a different active BWP pair, and may continue to monitor the PDCCH on the DL BWP linked to the UL BWP on which the first SR was transmitted. For example, the WTRU 102 may trigger an additional SR on a different sub-band/BWP depending on (e.g., based on) the SR transmission counter and/or the SR attempt counter of the first pending SR, and/or depending on (e.g., based on) the channel occupancy conditions.

The WTRU 102 may start (e.g., further start) an RA procedure on a different BWP and/or cell, for example upon and/or after reaching a certain number of SR retransmissions and/or attempts. For example, the WTRU 102 may determine and/or observe that the DL BWP on which PDCCH is sent is loaded (e.g., heavily loaded and/or loaded above a threshold level) although the active UL BWP is not loaded (e.g., lightly loaded and/or loaded below another threshold level). The WTRU 102 may initiate an RA procedure to change the active DL BWP of the WTRU 102. For example, the WTRU 102 may initiate a RA procedure on an UL BWP linked to a DL BWP that is lightly loaded, for example, which may be beneficial for a WTRU 102 capable of only a single active DL BWP at a time. Upon switching to a different LBT sub-band and/or BWP, the WTRU 102 may stop the ongoing SR procedure and may restart a new procedure. The WTRU 102 may reset the SR attempt counter upon and/or after switching BWPs/sub-bands, e.g. if the SR procedure is not reset. The WTRU may further reset the SR attempt counter upon expiry of a related reset timer configured by RRC.

Representative Procedure for SR Retransmissions

Figure 4:
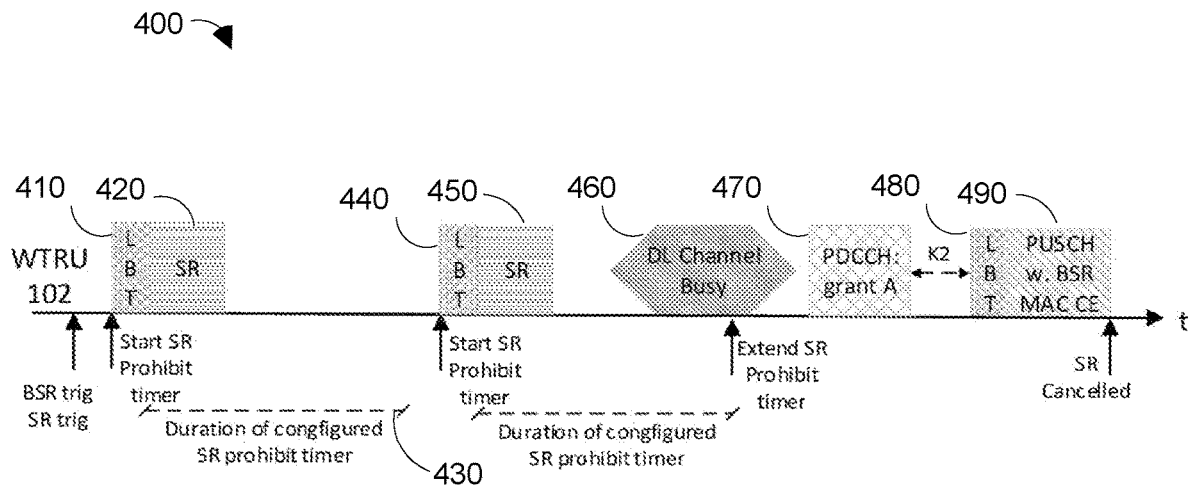
FIG. 4 is a diagram illustrating a representative procedure for SR retransmission used with LBT operations.

FIG. 4 is a diagram illustrating a representative procedure for SR retransmission which may extend a timer (e.g., a sr-ProhibitTimer) for example when a channel is busy (e.g., a U-NR DL and/or U-NR UL channel is busy).

Referring to FIG. 4, the representative procedure 400 for SR retransmission may include a WTRU 102 that may trigger a Buffer Status Report (BSR) or a Scheduling Request (SR). In certain representative embodiments, the BSR may trigger an SR. For NR-U, the WTRU 102 may perform an LBT operation, at 410, for example to determine whether an uplink channel of the unlicensed frequency bands is available for transmission. If the uplink channel is available for transmission, the WTRU 102 may generate an SR and may transmit the SR, at 420, to a network entity (e.g., a gNB 180) After or upon transmission of the SR, a timer (e.g., an SR prohibit timer) may be started and may expire after a SR prohibit period 430. If the WTRU 102 does not receive a reply (e.g., a grant) before the SR prohibit timer expires, the WTRU 102 may attempt to reacquire the channel using another LBT operation, at 440, and may send a second SR, at 450. For example, if the downlink (DL) channel is busy, at 460 (e.g., the network entity cannot send a reply (e.g., a grant), the WTRU 102 may extend the SR prohibit timer. At 470, during the extended SR prohibit period, the WTRU 102 may receive a grant over the downlink (e.g., on the PDCCH) with a predetermined or signaled delay period K2 (for example a delay in the range of 1-8 subframes or TTIs). After the delay period K2 the WTRU may attempt to acquire the channel using another LBT operation, at 480, and may send information (e.g., a BSR) using the uplink (e.g., the PUSCH) via, for example a BSR MAC CE. The WTRU 102 then may cancel the SR.

In certain representative embodiments, if the WTRU 102 determines that a network entity (e.g., a gNB 180) failed to transmit a PDCCH due to a LBT failure (e.g., when no grant is received by the WTRU 102), the WTRU 102 may extend or may reset a timer (e.g., a sr-ProhibitTimer), prior to an expiry of the timer. For example, a WTRU 102 may determine that the PDCCH was not sent due to the channel being busy for a duration of time; the WTRU 102 may add time (e.g., add a value representing a duration of time to the timer (e.g., the sr-ProhibitTimer), for example up to a certain maximum duration/value which may be configured (e.g., preconfigured, semistatically configured and/or signaled by a network entity).

In other representative embodiments, the WTRU 102 may extend or reset the timer (e.g., the sr-Prohibit Timer) upon and/or after receiving a PDCCH after transmitting the SR for an uplink grant, and/or after failing a LBT (e.g., an LBT operation) for the grant provided by the PDCCH. The WTRU may further monitor the PDCCH in anticipation to receive another UL grant, upon and/or after restarting the sr-ProhibitTimer. For example, the WTRU 102 may reset or add a value to sr-ProhibitTimer upon or after receiving an uplink grant after transmitting the SR. The added value may be configurable, predefined, and/or dependent on the uplink grant duration and/or grant transmission time. The use of the added value may be beneficial, for example, when the WTRU 102 receives the uplink grant after transmitting the SR, and could not transmit PUSCH, for example, due to an LBT failure. In another example, the WTRU 102 may extend or may reset the sr-ProhibitTimer upon and/or after failing an LBT operation for the PUSCH transmission on the grant received after sending a SR.

Figure 5:
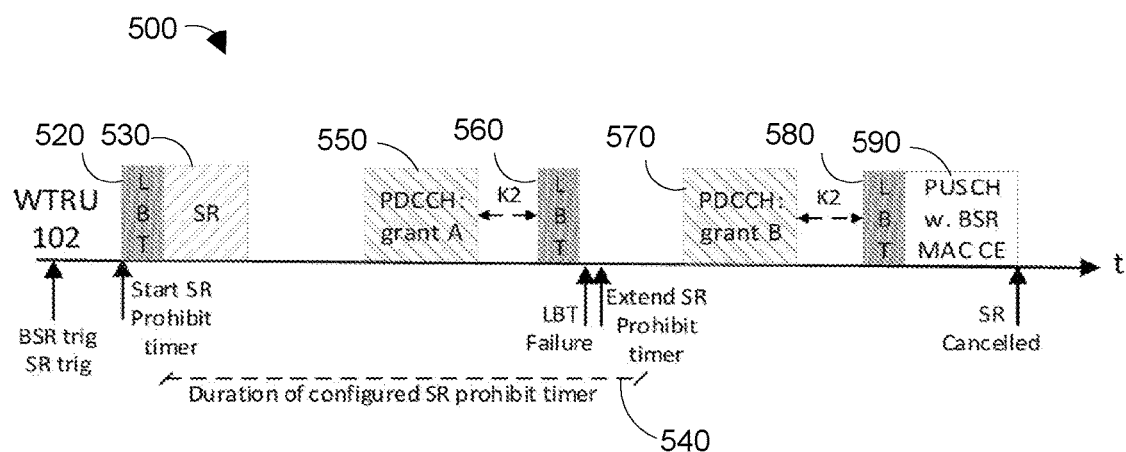
FIG. 5 is a diagram illustrating a representative procedure for a SR prohibit timer extension used with LBT operations.

FIG. 5 is a diagram illustrating a representative procedure for SR prohibit timer extension used with an LBT operation (e.g., where the WTRU 102 may extend a sr-ProhibitTimer upon or after failing the LBT for the PUSCH transmission on a grant received after sending the SR).

Referring to FIG. 5, the representative procedure 500 for SR prohibit timer extension may include a WTRU 102 that may trigger a BSR or a Scheduling Request (SR). In certain representative embodiments, the BSR may trigger the SR. For NR-U, the WTRU may perform a LBT operation, at 520, for example to determine whether an uplink channel of the unlicensed frequency bands is available for transmission. If the uplink channel is available for transmission, the WTRU 102 may generate an SR and may transmit the SR, at 530, to a network entity (e.g., a gNB 180). After or upon transmission of the SR, a timer (e.g., an SR prohibit timer) may be started and may expire after a SR prohibit period 540. If the WTRU 102 receives a reply (e.g., a grant 550) before the SR prohibit timer expires, the WTRU 102 may wait a delay period K2 (e.g., predetermined or signaled delay period, for example a delay in the range of 1-8 subframes or TTIs) and may attempt to reacquire the channel using another LBT operation, at 560. If the other LBT operation 560 fails, the WTRU may extend the SR prohibit timer for an extended period. At 570, the network entity (e.g., gNB 180) may send another grant to the WTRU 102 via the PDCCH in the DL. After receiving the grant, the WTRU 102 may wait a delay period K2 and may perform a further LBT operation 580. After the further LBT operation is successful (e.g., the channel is available) the WTRU 102 may send information (e.g., a BSR report) using the UL (e.g., the PUSCH) via, for example a BSR MAC CE. The WTRU 102 then may cancel the SR.

In certain representative embodiments, the WTRU 102 may extend or may reset the sr-ProhibitTimer for a given SR configuration upon and/or after transmitting another SR on a different sub-band, BWP, and/or SR configuration. The value added to the timer may depend on (e.g., be based on) any of: (1) the periodicity of the SR configuration of the additional SR, (2) the value configured for the SR prohibit timer for the additional SR, (3) a HARQ time line and/or Round Trip Time (RTT) of the BWP/sub-band on which the additional SR is sent, (4) the PDCCH monitoring period associated with the transmission of the additional SR, and/or (5) properties of the grant received on the PDCCH, among others. For example, the WTRU 102 may extend the sr-ProhibitTimer of a first pending SR upon or after transmitting another SR on a different BWP and/or SR configuration. This behavior may be dependent (e.g., further dependent) on the capability of the WTRU 102 to support multiple active BWPs.

Representative Procedure for SR Cancellation

If the WTRU 102 has already sent a SR (e.g., after a successful LBT), upon and/or after attempting to send a SR on a different sub-band and/or BWP, the WTRU 102 may: (1) cancel the previous SR and trigger an additional one; or (2) keep (e.g., maintain) the previous pending SR and trigger an additional one (e.g., an addition SR). The decision by the WTRU 102 may depend on (e.g., be based on): (1) the capability of the WTRU 102 to have (e.g., support) multiple active BWPs and/or BWP pairs, (2) whether a SR was actually transmitted in the PHY in the original BWP, and/or (3) the channel occupancy conditions on the original DL BWP. If the WTRU 102 cancels the previous pending SR, the WTRU 102 may reset (e.g., further reset) the SR attempt counter upon switching BWPs/sub-bands.

For a NR-licensed example, the WTRU 102 may cancel a pending SR upon and/or after transmission of a MAC PDU containing or including a BSR MAC CE. For NR-U, the WTRU 102 may cancel a pending SR upon transmission of a MAC PDU containing or including a BSR MAC CE and upon and/or after confirming from the PHY that a grant was transmitted on the PUSCH after a successful LBT, e.g. upon reception of an notification indicating LBT success or upon determining that an LBT failure indication from the PHY (e.g., the L1 or physical layer) is not received for the SR transmission attempt. Similarly, the WTRU 102 may cancel a pending BSR upon and/or after transmission of a MAC PDU containing or including a relevant BSR MAC CE and upon and/or after confirming from the PHY (e.g., L1 or physical layer) that a grant was transmitted on the PUSCH after a successful LBT.

Representative Procedure for Multiple Simultaneous LBT Attempts

It may be beneficial, for example, to attempt several LBTs on different resources and possibly in different sub-bands (e.g., each with its own LBT procedure) upon and/or after triggering a SR. This diversity may provide robustness against failure to acquire a channel in one or more sub-bands. Attempting multiple LBTs may be further dependent on any of the following: (1) the SR retransmission number; (2) the SR attempt number; (3) the indices of the UL and DL BWPs, and/or the linkage between or among UL and DL BWPs (e.g., if configured and/or valid); (4) whether a timer (e.g., a BWP inactivity timer) is running or is expired; (5) observed channel occupancy/load conditions on monitored sub-bands/BWPs; (6) a certain static or semi-static configuration, e.g., by RRC or SI; and/or (7) the capability of the WTRU 102 to support multiple active BWPs, among others. The WTRU 102 may further monitor PDCCH on multiple BWPs or sub-bands (e.g., certain BWPs or sub-bands) upon sending a SR, and which may depend on a configuration, and/or whether the WTRU 102 is capable of multiple active BWPs or BWP pairs.

Representative Configured Grant Transmission

A WTRU 102 may be configured with an ability to perform grant-free transmissions by using configured grants. A WTRU 102 may perform the LBT prior to transmitting on a configured grant. In some cases, the LBT may fail and the WTRU 102 may wait and/or may have to wait until a future configured grant occasion or a scheduled grant to transmit data of the WTRU 102, for example which may add unwanted latency. A WTRU 102 may be configured with conditional configured grant resources. Such conditional configured grant resources may (or may only) be used if a preceding (or immediately preceding) configured grant was unused by the WTRU 102, for example due to failed LBT. To use a conditional configured grant, a WTRU 102 may be configured to first receive a trigger signal from a network entity (e.g., the gNB 180) indicating that a conditional configured grant is valid. The WTRU 102 may perform an LBT (prior to or after receiving the conditional configured grant trigger signal) in a manner similar to that described herein for a PRACH trigger.

FIG. 6 is a flow chart illustrating a representative procedure using one or more unlicensed frequency bands.

Referring to FIG. 6, the representative procedure 600 may be implemented by a WTRU 102 to perform system access using one or more of unlicensed frequency bands. At block 610, the WTRU 102 may obtain LBT information indicating an LBT configuration including parameters applicable to transmission of a Random Access (RA) Preamble (RAP). At block 620, the WTRU 102 may determine, based on the LBT configuration, whether a respective unlicensed frequency band of the one or more of unlicensed frequency bands or an unlicensed channel of a plurality of unlicensed channels is available for transmission. At block 630, the WTRU 102 may transmit the RAP over a RA channel (RACH) using the respective unlicensed frequency band or unlicensed channel on condition that the respective unlicensed frequency band or unlicensed channel is available for transmission.

In certain representative embodiments, the WTRU may determine any of: (1) that an uplink transmission is required; (2) that a random access procedure is initiated; or (3) that a scheduling request is pending and may monitor for a presence of information (e.g., LBT information and/or CTT information) in accordance with this determination.

In certain representative embodiments, the WTRU 102 may set the indicated parameters and may transmit the RAP in accordance with the set parameters.

In certain representative embodiments, the WTRU may (1) receive the LBT information from a network entity (e.g., a gNB 180); (2) receive, from the network entity, information associated with a plurality of LBT configurations and select one of the plurality of LBT configurations, as a selected LBT configuration; and/or (3) select one of the plurality of predetermined LBT configurations, as the selected LBT configuration.

In certain representative embodiments, the WTRU 180 may monitor for a preamble transmission trigger (PTT) and/or the LBT configuration may be selected in accordance with whether the PTT has been received.

In certain representative embodiments, the PTT may indicate valid RACH resources to transmit the RAP and/or may be any of: (1) an explicit trigger or (2) an implicit trigger based on a transmission from the network entity including (i) one or more system synchronization blocks (SSBs); (ii) one or more Reference Signals (RSs); (iii) one or more control channels (CCHs); (iv) one or more master information blocks (MIBs) and/or (v) one or more system information blocks (SIBs).

In certain representative embodiments, the PTT may indicate one or more acceptable purposes for which the RACH resources can be used.

In certain representative embodiments, the monitoring for the PTT may include the WTRU 102 monitoring for a current PTT of a plurality of PTTs. For example, the WTRU 102 determining of whether the respective unlicensed frequency band or unlicensed channel is available for transmission may include the WTRU 102 determining whether the respective unlicensed frequency band or unlicensed channel is available for a current transmission or a current retransmission over the unlicensed frequency band or unlicensed channel in accordance with the LBT configuration selected based on the current PTT.

In certain representative embodiments, the PTT may be included in a Random Access Response (RAR).

In certain representative embodiments, using a COT sharing operation, the WTRU 102 may acquire for communications with a network entity (e.g., a gNB 108 or a network access point (NAP), the respective unlicensed frequency band or unlicensed channel to complete a RACH operation (or a series of RACH operations) after determining that the respective unlicensed frequency band or unlicensed channel is available. The WTRU 102 may maintain for communications with the network entity, the acquired respective unlicensed frequency or unlicensed channel during the completion of the RACH procedure (e.g., or the series of RACH operation). The WTRU 102 may release the acquired respective unlicensed frequency band or unlicensed channel after the completion of the RACH procedure (e.g., or series of RACH operations). For example, the WTRU 102 may share, with the network entity, the unlicensed frequency band or unlicensed channel during the completion of the RACH procedure (e.g., or series of RACH operations) based on a predetermined series of transmissions between the WTRU and the network entity.

Although COT sharing for RACH is disclosed, COT sharing may be used with other types of procedures/operations including SR operation/procedures and other control signaling procedures/operations. For example, since the WTRU may acquire and may share the unlicensed band or channel for a long duration, the WTRU may only perform an LBT operation initially and may not perform another LBT during the completion of the RACH procedure (or series of RACH operations) and possible other sequence transmissions.

In certain representative embodiments, the WTRU 102 may perform one of: (1) a short LBT operation; or (2) a long LBT operation.

In certain representative embodiments, the WTRU 102 may monitor for a response and/or may determine whether to extend, pause or reset an expiry time of a timer based on any of: (1) whether the response is to be received over or no the unlicensed frequency band or unlicensed channel; (2) that the unlicensed frequency band or unlicensed channel is busy and/or (3) that the network entity did not acquire the unlicensed frequency band or unlicensed channel, as a determined result. The WTRU 102 may extend, pause, or reset the timer in accordance with the determined result. For example, the WTRU 102 may retransmit the RA preamble on condition that the timer expires prior to reception of the response.

In certain representative embodiments, the WTRU 102 may adjust any of: a RA response timer and/or a contention resolution timer according to channel occupancy conditions.

In certain representative embodiments, he WTRU 102 may monitoring for a RA Response (RAR), may transmit a first message; and may monitor for a second message such that the RAP, the RAR, the first message and the second message may be transmitted and/or received on different resources, each using a different LBT operation.

In certain representative embodiments, the WTRU 102 may apply a backoff value to a backoff timer according to a preconfigured value that depends on one or more channel occupancy conditions.

In certain representative embodiments, after transmitting the RAP, the WTRU 102 may determine that a RA Response was not transmitted on the unlicensed frequency band or unlicensed channel by the network entity (e.g., a gNB or a network access point). The WTRU 102 may detect that the unlicensed frequency band or unlicensed channel is available and may start a backoff timer. For example, the WTRU 102 may retransmit the RAP when the backoff timer expires.

In certain representative embodiments, the WTRU 102 may adjust, pause, or stop the backoff timer on condition that the WTRU determines that the unlicensed frequency band or unlicensed channel is busy or that the network entity (e.g., gNB 180 or network access point) could not acquire the unlicensed frequency band. For example, the WTRU 102 may adjust the backoff timer using a random backoff value, for example to provide a random backoff delay, when the unlicensed frequency band or unlicensed channel becomes available again.

In certain representative embodiments, after failing to: (1) acquire the unlicensed frequency band for the RAP; or (2) receive a RA Response, the WTRU 102 may retransmit the RAP on any of: a different sub-band, a different interlace, and/or a different preamble/RA channel RACH occasion.

In certain representative embodiments, the WTRU 102 may determine a RA priority and/or may set, based on the determined RA priority, any of: a selected LBT window and/or a configuration relative to a non-differentiated RA.

In certain representative embodiments, the WTRU 102 may skip or apply a different LBT configuration prior to transmission of the first message, based on configured or signaled switching points.

FIG. 7 is a flow chart illustrating another representative procedure using one or more unlicensed frequency bands.

Referring to FIG. 7, the representative procedure 700 may be implemented by a WTRU 102 to perform system access using one or more of unlicensed frequency bands. At block 710, the WTRU 102 may monitor, for, from a network entity (e.g., a gNB or NAP) a preamble transmission trigger (PTT) indicating that an unlicensed frequency band or an unlicensed channel is available. At block 720, the WTRU 102 may transmit a Random Access Preamble (RAP) over the available unlicensed frequency band or unlicensed channel. For example, the PTT may indicate valid RACH resources to transmit the RAP and may be any of: (1) an explicit trigger or (2) an implicit trigger.

In certain representative embodiments, the WTRU 102 may provide for (e.g., use) a plurality of predetermined Listen-Before-Talk (LBT) operations. Th The WTRU 102 may determine whether to perform an LBT operation and on condition that the LBT operation is to be performed, the WTRU 102 may select one of the plurality of LBT operations based on a received PTT. The WTRU 102 may confirm, based on the selected LBT operation, that the unlicensed frequency band or unlicensed channel is available prior to the transmission of the RAP.

In certain representative embodiments, the selected LBT operation may have more relax requirements for availability than if the PTT was not received.

In certain representative embodiments, prior to monitor for the PTT the WTRU 102 may determine that the WTRU is to perform system access. The WTRU 102 may set a backoff timer; and may wait for the PTT to be received. On condition that the backoff timer expires prior to the PTT being received, the WTRU 102 may extend, or reset the backoff timer. On condition that the PTT is received prior to the backoff timer expiry, the WTRU 102 may transmit of the RAP over or on the available unlicensed frequency band or unlicensed channel.

FIG. 8 is a flow chart illustrating a further representative procedure using one or more unlicensed frequency bands.

Referring to FIG. 8, the representative procedure 800 may be implemented by a WTRU 102, for example to perform system access, using one or more of unlicensed frequency bands. At block 810, the WTRU 102 may determine whether an uplink channel of the unlicensed frequency bands is available for transmission. At block 820, on condition that the uplink channel is available for transmission, the WTRU 102 may generate a first Scheduling Request (SR) for an SR operation and may transmit the first SR to a network entity (e.g., a gNB 180 or NAP). At block 830, the WTRU 102 may initiate a prohibit timer to prohibit a further SR operation until an expiry of a first time period. At block 840, the WTRU 102 may determine after the transmission of the first SR, whether a downlink channel of the unlicensed frequency bands is available to the network entity (e.g., the gNB 180 or NAP) for transmission. At block 850, on condition that the downlink channel is not available to the network entity (e.g., the gNB 180 or NAP) for transmission, the WTRU 102 may extend an expiry of the prohibit timer, for example to wait a further time period for a response from the network entity (e.g., a gNB 180 or NAP) to the first SR.

In certain representative embodiments, the WTRU 102 may receive, from the network entity, an uplink grant prior to expiry of the further time period. The WTRU 102 may determine after reception of the uplink grant, whether the uplink channel is available for transmission. on condition that the uplink channel is available for transmission, the WTRU 102 may transmit, Buffer Status Report (BSR) information over or on the uplink channel. A higher layer of the WTRU 120 may cancel the first SR, on condition that (1) the BSR information is transmitted by a physical layer (e.g., a lower layer) and/or (2) an indication is received from the physical layer that an LBT operation was successful for the uplink channel transmission.

In certain representative embodiments, on condition that the prohibit timer expires after either the first time period or the further time period, the WTRU 102 may initiate the further SR operation by determining whether the uplink channel or another uplink channel of the unlicensed frequency bands is available for transmission and on condition that the uplink channel or other uplink channel is available for transmission: (1) generating a further SR for the further SR operation, and/or transmitting to a network entity, the further SR.

FIG. 9 is a flow chart illustrating an additional representative procedure using one or more unlicensed frequency bands.

Referring to FIG. 9, the representative procedure 900 may be implemented by a WTRU 102, for example to perform system access, using one or more of unlicensed frequency bands. At block 910, the WTRU 102 may determine whether an uplink channel of the unlicensed frequency bands is available for transmission. At block 920, on condition that the uplink channel is available for transmission, the WTRU 102 may generate a first Scheduling Request (SR) for a first SR operation, and may transmit the first SR to a network entity. At block 930, the WTRU 102 may initiate a prohibit timer to prohibit a further SR operation until an expiry of a first time period. At block 940, the WTRU 102 may receive from the network entity, an uplink grant prior to expiry of the first time period. At block 950, the WTRU 102 may determine after reception of the uplink grant, whether the uplink channel is available for transmission. At block 960, on condition that the uplink channel is unavailable for transmission, the WTRU 102 may extend the expiry of the prohibit timer to wait a further time period for reception of a further uplink grant from the network entity. At block 970, the WTRU 102 may receive, by the WTRU from the network entity, the further uplink grant prior to the expiry of the further time period.

In certain representative embodiments, the WTRU 102 may determine, after the reception of the further uplink grant, whether the uplink channel is available for transmission. On condition that the uplink channel is available for transmission, the WTRU 102 may transmit Buffer Status Report (BSR) information over the uplink channel. A higher layer of the WTRU 102 may cancel the first SR, on condition that the BSR information is transmitted by a physical layer (e.g., a lower or lowest layer) and an indication is sent from the physical layer that an LBT operation was successful for the uplink channel transmission.

FIG. 10 is a flow chart illustrating a yet further representative procedure, for example to perform system access, using one or more unlicensed frequency bands.

Referring to FIG. 10, the representative procedure 1000 may be implemented by a WTRU 102 using one or more of unlicensed frequency bands. At block 1010, the WTRU 102 may determine whether any of: a plurality of sub-bands and/or bandwidth parts (BWPs) are available for transmission. At block 1020, on condition that two or more of the plurality of sub-bands and/or bandwidth parts are available for transmission, the WTRU 102 may attempt one or more LBT procedures (e.g., simultaneously, near simultaneously or sequentially) on the available resources to transmit a random access preamble or a Scheduling Request over the available sub-bands and/or bandwidth parts. At block 1030, the WTRU 102 may receive, from a network entity, a response to the transmission from the WTRU over any of: the plurality of sub-bands or bandwidth parts.

In certain representative embodiments, after reception of the response, the WTRU 102 may determine whether any of: the plurality of sub-bands or bandwidth parts are available for transmission by the WTRU. For example, one condition that two or more of the plurality of sub-bands or bandwidth parts are available for transmission, the WTRU 102 may transmit a message over or on the two or more of the available sub-bands or bandwidth parts.

In certain representative embodiments, the transmission of the random access preamble over the available sub-bands or bandwidth parts, simultaneously or near simultaneously may be further conditioned on any of: (1) a preamble retransmission number; (2) a Radio Resource Control (RRC) configuration; (3) a preamble attempt number; (4) indices of the uplink (UL) and downlink (DL) bandwidth parts; (5) a linkage between or among the UL and DL bandwidth parts; (6) whether a bandwidth part inactivity timer is running; (7) observed channel occupancy and/or load conditions on the sub-bands and/or the bandwidth parts; (8) one or more particular configurations received via signaling; and/or (9) a capability of the WTRU to support multiple active bandwidth parts.

FIG. 11 is a flow chart illustrating a yet additional representative procedure, for example to perform system access, using one or more unlicensed frequency bands.

Referring to FIG. 11, the representative procedure 1100 may be implemented by a WTRU 102 using one or more of unlicensed frequency bands. At block 1110, the WTRU 102 may determine whether a first sub-band or a first bandwidth part of the unlicensed frequency bands is available for transmission or retransmission. At block 1120, on condition that the first sub-band or the first bandwidth part is available for transmission, the WTRU 102 may transmit a random access preamble over the available first sub-band or the available first bandwidth part. At block 1130, the WTRU 102 may increment a preamble attempt counter after each determination of unavailability. At block 1140, on condition that the attempt counter reaches a threshold level, the WTRU 102 may determine whether a second sub-band or a second bandwidth part is available for transmission or retransmission. At block 1150, on condition that the second sub-band or the second bandwidth part is available for transmission, the WTRU 102 may switch to a second available channel and/or transmit the random-access preamble over the available second sub-band or the available second bandwidth part.

In certain representative embodiments, a lower layer of the WTRU 102 may report a problem to higher layers on condition that channels are not available for transmission or retransmission In certain representative embodiments, the WTRU 102 may determine whether the first sub-band or the first bandwidth part is available for transmission or retransmission. For example, the WTRU 102 may transmit the random access preamble over or on any of: the first and second sub-bands and/or the first and second bandwidth parts that are available.

FIG. 12 is a flow chart illustrating a representative procedure to select a LBT configuration.

Referring to FIG. 12, the representative procedure 1200 may be implemented by a WTRU 102 using one or more of unlicensed frequency bands. At block 1210, the WTRU 102 may receive, in a downlink message, uplink channel transmission trigger (UCTT) information. At block 1220, the WTRU 102 may select a type of LBT configuration to be performed based on the received UCTT information. At block 1230, the WTRU 102 may determine, in accordance with the selected LBT configuration, whether the unlicensed frequency uplink channel is available for transmission. At block 1240, on condition that the unlicensed frequency uplink channel is available for transmission in accordance with the selected LBT configuration, the WTRU 102 may transmit data or control information over or on the unlicensed frequency uplink channel.

In certain representative embodiments, the selected LBT configuration may indicate that, for the unlicensed frequency uplink channel, one of: (1) a full LBT operation is to be performed; a shortening LBT operation is to be performed; and/or (3) no LBT operation is to be performed.

In certain representative embodiments, the UCTT information may indicate uplink control channel resources to transmit at least the control information and may include any of: (1) downlink control information received in a downlink control channel, in a common search space and/or in a WTRU-specific search space. The UCTTI may indicate any of: (1) a type of UCI to be transmitted in the uplink channel; (2) an index to a valid resource or resources for the uplink channel and/or (3) a transmission time associated with the uplink channel.

In certain representative embodiments, the control information may be a Scheduling Request (SR); and the WTRU 102 may transmit the SR using a first set of uplink channel resources not indicated by the UCTT information and a second set of uplink channel resources indicated by the UCTT information.

In certain representative embodiments, the control information may be a Scheduling Request (SR); and the WTRU 102 may transmit the SR using a first set of uplink channel resources indicated by a first resource index and a second set of uplink channel resources indicated by a second resource index in accordance with the UCTT information.

FIG. 13 is a flow chart illustrating a representative procedure for retransmission after failure of an LBT operation.

Referring to FIG. 13, the representative procedure 1300 may be implemented by a WTRU 102 using one or more of unlicensed frequency bands. At block 1310, the WTRU 102 may determine whether a channel (e.g., a first sub-band or a first bandwidth part of the one or more unlicensed frequency bands) is available for transmission. At block 1320, on condition that the channel is available for transmission, the WTRU 102 may transmit a Scheduling Request (SR) over or on the available channel. At block 1330, the WTRU 102 may increment an attempt counter, after each determination of channel unavailability. At block 1340, on condition that the attempt counter reaches a threshold level, the WTRU 102 may determine whether to any of: (1) determine whether a further channel is available and switch to it; (2) transmit an SR on the further channel; (3) initiating a random access procedure on the further channel; (3) reporting a problem to higher layers; and/or (4) changing an LBT configuration used. At block 1350, on condition that the WTRU determines to retransmit the SR or RA-SR on the further channel, the WTRU 102 may determine whether the further channel is available. At block 1360, the WTRU 102 may retransmit the SR or RA-SR over or on the further channel.

FIG. 14 is a flow chart illustrating a representative procedure using a preamble trigger.

Referring to FIG. 14, the representative procedure 1400 may be implemented by a WTRU 102, for example to perform system access, using one or more of unlicensed frequency bands. At block 1410, the WTRU 102 may monitor for a preamble transmission trigger (PTT). At block 1420, on condition that the PTT is received, the WTRU 102 may transmit a Random Access Preamble (RAP) over or on a respective unlicensed frequency band of the one or more unlicensed frequency bands.

In certain representative embodiments, the WTRU 102 may monitor the respective unlicensed band to determine whether the respective unlicensed band is available for transmission and/or may transmit of the RAP over or on an unlicensed frequency band, on condition that the PTT is received after the unlicensed frequency band is determined to be available based on the WTRU monitoring. For example, the monitoring of the respective unlicensed frequency band may include continuously or periodically monitoring of the respective unlicensed frequency band. The WTRU 102 may determine whether the respective unlicensed band is available for transmission by performing one or more LBT operations.

Figure 15:
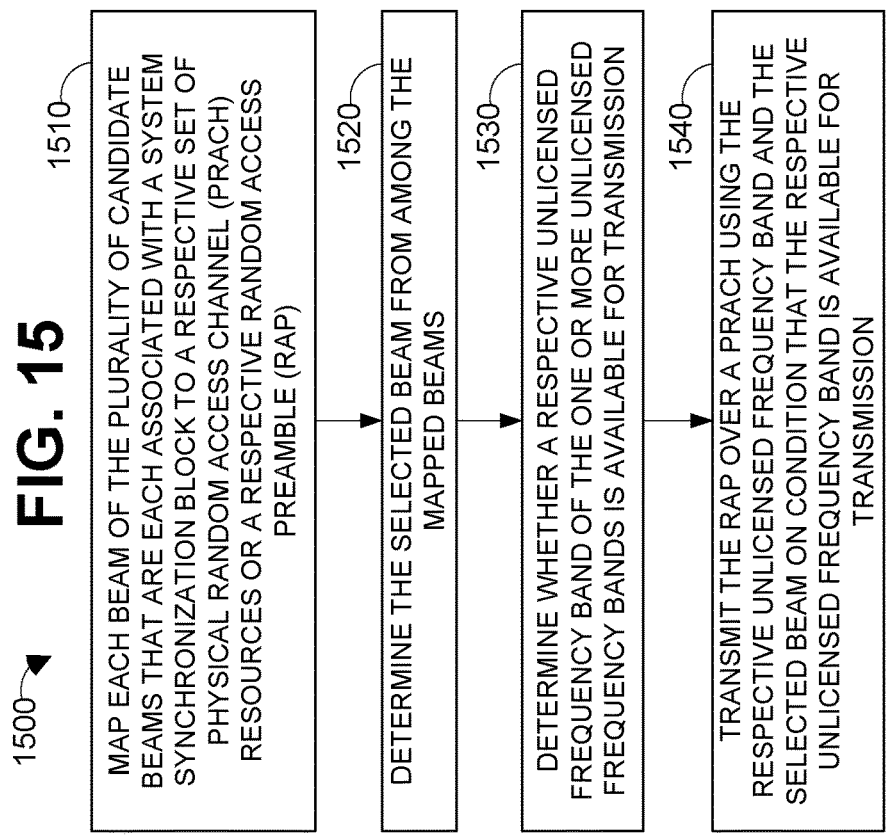
FIG. 15 is a flow chart illustrating a representative procedure using a selected beam.

FIG. 15 is a flow chart illustrating a representative procedure using a selected beam.

Referring to FIG. 15, the representative procedure 1500 may be implemented by a WTRU 102, for example to perform system access, using one or more of unlicensed frequency bands and a selected beam of a plurality of candidate beams. At block 1510, the WTRU 102 may map each beam of the plurality of candidate beams that are each associated with a system synchronization block to a respective set of PRACH resources or a respective Random Access Preamble (RAP). At block 1520, the WTRU 102 may. determine the selected beam from among the mapped beams. At block 1530, the WTRU 102 may determine whether a respective unlicensed frequency band of the one or more unlicensed frequency bands is available for transmission. At block 1540, on condition that the respective unlicensed frequency band is available for transmission, the WTRU 102 may transmit the RAP over a PRACH using the respective unlicensed frequency band and the selected beam.

In certain representative embodiments, on condition that the respective unlicensed frequency band is unavailable for transmission, the WTRU 102 may remap a portion of the beams of the plurality of candidate beams that are each associated with the system synchronization block to the same or another set of PRACH resources or the same or another Random Access Preamble (RAP) and/or may determine a new selected beam from among the remapped beams. The WTRU 102 may determine whether the respective unlicensed frequency band of the one or more unlicensed frequency bands is available for transmission. On condition that the respective unlicensed frequency band is available for transmission, the WTRU 102 may transmit the same RAP or the other RAP over or on the PRACH using the respective unlicensed frequency band and the new selected beam.

In certain representative embodiments, on condition that the respective unlicensed frequency band is unavailable for transmission, the WTRU 102 may select a new unlicensed frequency band from among the one or more unlicensed frequency band and/or may determine whether the new unlicensed frequency band is available for transmission. On condition that the new unlicensed frequency band is available for transmission, the WTRU 102 may transmit the same RAP or another RAP over or on the PRACH using the new unlicensed frequency band and the selected beam.

In certain representative embodiments, on condition that the respective unlicensed frequency band is unavailable for transmission, the WTRU 102 may wait for a next RACH occasion. The WTRU 102 may determine whether the respective unlicensed frequency band of the one or more of unlicensed frequency bands is available during the next RACH occasion for transmission. The WTRU 102 may transmit the RAP over or on the RACH using the respective unlicensed frequency band and the selected beam or another beam after remapping on condition that the respective unlicensed frequency band is available for transmission.

In certain representative embodiments, the determination of the selected beam or the newly selected beam may include the WTRU 102 receiving downlink information including a plurality of synchronization signal blocks (SSBs) and determining the selected beam based on one or more signal characteristics of one SSB of the plurality of SSBs that is associated with the selected beam.

Figure 16:
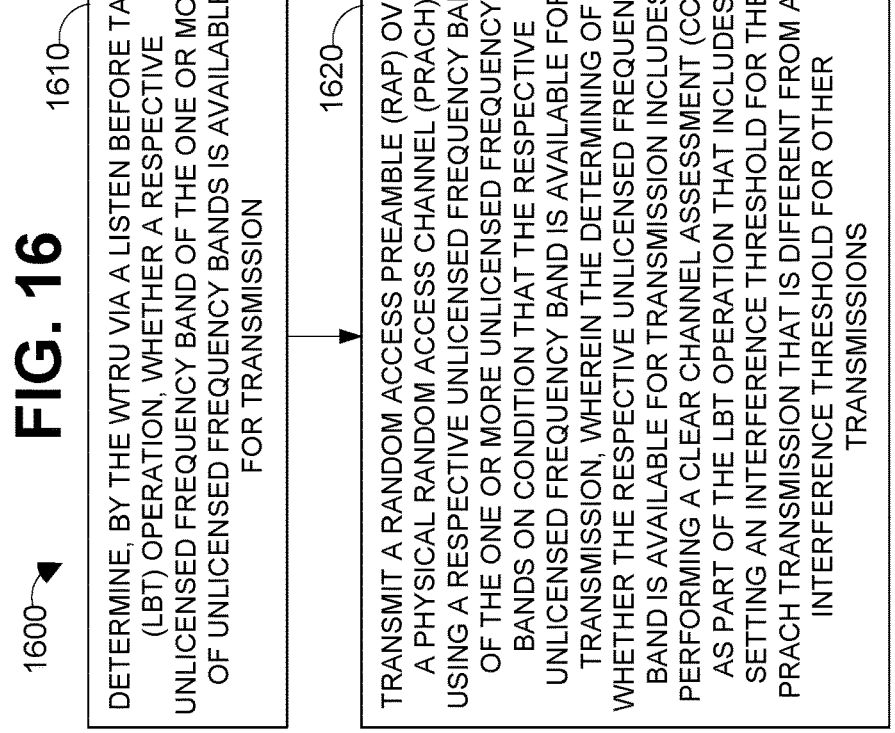
FIG. 16 is a flow chart illustrating a representative procedure using an interference threshold.

FIG. 16 is a flow chart illustrating a representative procedure using an interference threshold.

Referring to FIG. 16, the representative procedure 1600 may be implemented by a WTRU 102, for example to perform system access, using one or more of unlicensed frequency bands. At block 1610, the WTRU 102 may determine via an LBT operation, whether a respective unlicensed frequency band of the one or more of unlicensed frequency bands is available for transmission. At block 1620, on condition that the respective unlicensed frequency band is available for transmission, the WTRU 102 may transmit a RAP over or on a PRACH using a respective unlicensed frequency band of the one or more unlicensed frequency bands. For example, the determination of whether the respective unlicensed frequency band is available for transmission may include the WTRU 102 performing a clear channel assessment (CCA) as part of the LBT operation that includes setting an interference threshold for the PRACH transmission that is different from an interference threshold for other transmissions.

In certain representative embodiments, the interference thresholds for a PRACH transmission and the other transmissions used for the CCA vary over a course of the LBT operation.

In certain representative embodiments, the WTRU 102 may receive an LBT configuration that may include or may indicate variable CCA thresholds, and/or a variable timing offset between an end of the LBT operation and a beginning of the transmission of the RAP on the PRACH.

In certain representative embodiments, the WTRU 102 may determine that: (1) the respective unlicensed frequency band is available prior to a time determined by an offset and a timing of the transmission of the RAP on the PRACH; or (2) the respective unlicensed frequency band is not available.

FIG. 17 is a flow chart illustrating a representative procedure using a selected LBT operation.

Referring to FIG. 17, the representative procedure 1700 may be implemented by a WTRU 102, for example to perform system access, using one or more of unlicensed frequency bands. At block 1710, the WTRU 102 may determine whether an uplink transmission may be transmitted in the same slot and/or the same symbols as another uplink transmission from another WTRU, as a determined result. At block 1720, the WTRU 102 may select an LBT operation from a set of candidate LBT operations based on the determined result and the selected LBT operation may be different from the other candidate LBT operations in any of: (1) a type of LBT operation or (2) LBT parameters used in the LBT operation. At block 1730, the WTRU 102 may determine, via the selected LBT operation, whether a respective unlicensed frequency band of the one or more of unlicensed frequency bands is available for transmission. At block 1740, on condition that the unlicensed frequency bands are available for transmission, the WTRU 102 may transmit a RAP over or on a PRACH using the respective unlicensed frequency band.

FIG. 18 is a flow chart illustrating a representative procedure using interlacing information; and Referring to FIG. 18, the representative procedure 1800 may be implemented by a WTRU 102, for example to perform system access, using one or more of unlicensed frequency bands. At block 1810, the WTRU 102 may obtain any of: (1) interlacing information sent by a network entity or (2) pre-configured interlacing rule information. At block 1820, the WTRU 102 may map any of: a PUSCH and/or a PRACH of the WTRU to time/frequency elements in a respective unlicensed frequency band of the one or more unlicensed frequency bands based on the obtained information such that the PUSCH and/or the PRACH of the WTRU are to be interlaced with uplink information of one or more other WTRUs. At block 1830, the WTRU 102 may transmit the PUSCH and/or PRACH channels on the mapped time/frequency elements of the respective unlicensed frequency band.

In certain representative embodiments, (1) the PUSCH may be interlaced and the PRACH may not be interlaced; (2) the PUSCH and the PRACH may be transmitted using different interlaces; and/or (3) the PUSCH and the PRACH may be transmitted using a single interlace.

FIG. 19 is a flow chart illustrating a representative procedure using a conditional grant indicator.

Referring to FIG. 19, the representative procedure 1900 may be implemented by a WTRU 102, for example to perform system access, using one or more of unlicensed frequency bands. At block 1910, the WTRU 102 may transmit a RAP over or on a PRACH using a respective unlicensed frequency band of the one or more of unlicensed frequency bands. At block 1920, the WTRU 102 may receive a grant for uplink resources associated with the respective unlicensed frequency band. At block 1930, the WTRU 102 may determine whether the respective unlicensed frequency band associated with the grant is available for transmission. At block 1940, the WTRU 102 may perform one of: (1) transmitting an uplink communication using the respective unlicensed frequency band on condition that the respective unlicensed frequency band is available for transmission, or (2) transmitting the uplink communication using the respective unlicensed frequency band when the respective unlicensed frequency band becomes available on condition that a conditional grant indicator is set.

FIG. 20 is a flow chart illustrating a representative procedure using a channel.

Referring to FIG. 20, the representative procedure 2000 may be implemented by a WTRU 102, using a channel, for example of one or more of unlicensed frequency bands. At block 2010, the WTRU 102 may receive in a downlink message, a channel transmission trigger (CTT). At block 2020, the WTRU 102 may select a type of a Listen Before Talk (LBT) configuration to be performed based on the received CTT. At block 2030, the WTRU 102 may determine, in accordance with the type of LBT configuration selected, whether the channel is available for transmission. At block 2040, on condition that the channel is available for transmission, the WTRU 102 may transmit data or control information on the channel.

In certain representative embodiments, the selecting of the type of LBT configuration to be performed may be further based on any of: (1) contents of the CTT; and/or (2) timing of CTT reception and timing of a corresponding uplink transmission.

In certain representative embodiments, the WTRU 102 may determine an LBT configuration implicitly based on a time difference between the CTT reception and a start of an uplink transmission, or explicitly from the CTT contents.

In certain representative embodiments, the WTRU 102 may determine that a transmission required and may monitor for a presence of the CTT after the determination that the transmission is required.

In certain representative embodiments, the channel may be any of: (1) one or more frequency bands, (2) one or more component carriers, (3) one or more bandwidth parts, (4) one or more sub-bands, (5) one or more LBT bandwidths, and/or (6) time/frequency resources.

In certain representative embodiments, the type of LBT configuration selected may indicate that, for the channel, one of: (1) a full LBT operation is to be performed; (2) a shortening LBT operation is to be performed; or (3) no LBT operation is to be performed.

In certain representative embodiments, the CTT may indicate at least uplink control channel resources to transmit the control information and/or the CTT may include downlink control information received by the WTRU in a common search space or in a WTRU-specific search space.

In certain representative embodiments, the CTT may indicates any of: (1) a type of UCI to be transmitted on the channel; (2) an index to a valid resource or resources for the channel (3) a transmission time associated with the channel; and/or (4) the LBT configuration applicable to the uplink transmission following the reception of the CTT.

In certain representative embodiments, the control information is a Scheduling Request (SR) and/or the transmitting of the SR on the channel may include transmitting the SR using a first set of channel resources not indicated by the CTT or using a second set of channel resources indicated by the CTT.

In certain representative embodiments, the WTRU 102 may obtain LBT information including at least an LBT configuration of a first type, an LBT configuration of a second type. For example, the LBT configuration of a first type may be an LBT configuration for a shortened LBT operation, the LBT configuration of a second type may be an LBT configuration for a full LBT operation, and/or the LBT configuration of a third type may be an LBT configuration for no LBT operation.

In certain representative embodiments, the control information may include a Random Access Preamble (RAP) or a Message3 used in a random access procedure. The CTT may, for example indicate Random Access Channel (RACH) resources to transmit the RAP and/or the CTT may be any of: (1) an explicit trigger or (2) an implicit trigger based on a transmission from a network entity including (i) one or more system synchronization blocks (SSBs); (ii) one or more Reference Signals (RSs); or (iii) one or more downlink control channels (DCCH).

In certain representative embodiments, the CTT may indicates one or more acceptable purposes for which the RACH resources can be used.

FIG. 21 is a flow chart illustrating another representative procedure using a channel.

Referring to FIG. 21, the representative procedure 2100 may be implemented by a WTRU 102, using one or more channels, for example of one or more of unlicensed frequency bands. At block 2110, the WTRU 102 may determine whether a preamble transmission or a Scheduling Request transmission attempt fails an LBT operation for a first channel. At block 2120, the WTRU 102 may increment a preamble/SR attempt counter for each attempt failure. At block 2130, on condition that the attempt counter reaches a threshold level, the WTRU 102 may (1) perform a switch to a further channel; (2) transmit an SR on the further channel; (3) initiate a random access procedure on the further channel; (4) report a problem to higher layers; and/or (5) change an LBT configuration used. For example, the further channel may be different from the first channel.

In certain representative embodiments, the first channel may be any of: (1) a first set of one or more frequency bands, (2)) a first set of one or more component carriers, (3)) a first set of one or more bandwidth parts, (4) a first set of one or more sub-bands, (5) a first set of one or more LBT bandwidths, (6) a first cell, (7) a first set of physical layer characteristic, and/or (8) a first set of time/frequency resources.

In certain representative embodiments, the further channel may be any of: (1) a second set of one or more frequency bands, (2)) a second set of one or more component carriers, (3)) a second set of one or more bandwidth parts, (4) a second set of one or more sub-bands, (5) a second set of one or more LBT bandwidths, (6) a second cell, (7) a second set of physical layer characteristic, and/or (8)) a second set of time/frequency resources.

In certain representative embodiments, the determining of whether the preamble transmission or the SR transmission attempt fails a listen Before Talk (LBT) operation for the first channel may include determining a number of failed LBT attempts for the first channel such that the attempt counter is incremented after each LBT attempt failure until the attempt counter reaches the threshold level such that prior to the attempt counter reaching the threshold level, repeatedly attempting an LBT operation on the first channel and after the attempt counter reaches the threshold level, possibly repeatedly attempting an LBT operation on the further channel.

FIG. 22 is a flow chart illustrating a further representative procedure using a channel.

Referring to FIG. 22, the representative procedure 2200 may be implemented by a WTRU 102, using a further channel, for example of one or more of unlicensed frequency bands. At block 2210, the WTRU 102 may determine that a first channel is not available for transmission or retransmission and that a further channel is available for transmission or retransmission. At block 2220, the WTRU 102 may switch to the further available channel for a preamble transmission or retransmission.

In certain representative embodiments, the first channel may be any of: (1) a first set of one or more frequency bands, (2) a first set of one or more component carriers, (3) a first set of one or more bandwidth parts, (4) a first set of one or more sub-bands, 95) a first set of one or more cells or (6) a first set of one or more time/frequency resources; and the further channel may be any of: (1) a further set of one or more frequency bands, (2) a further set of one or more component carriers, (3) a further set of one or more bandwidth parts, (4) a further set of one or more sub-bands, or (5) a further set of one or more time/frequency resources.

In certain representative embodiments, the preamble may be a Random Access (RA) preamble of an ongoing RA procedure or a newly initiated procedure.

In certain representative embodiments, the determination of whether the further channel is available for transmission or retransmission may be further conditioned on whether an availability attempt counter has reached a configured threshold value.

FIG. 23 is a flow chart illustrating an additional representative procedure using a channel.

Referring to FIG. 23, the representative procedure 2300 may be implemented by a WTRU 102, using a channel, for example of one or more of unlicensed frequency bands. At block 2310, the WTRU 102 may perform an LBT operation to determine whether the channel is available for transmission. At block 2320, on condition that the channel is not available, the WTRU 102 may apply a random backoff to a backoff timer immediately or after the channel becomes available, may wait for an expiry of the backoff timer, and may transmit on the channel after the expiry of the backoff timer.

FIG. 24 is a flow chart illustrating yet another representative procedure using a channel.

Referring to FIG. 24, the representative procedure 2400 may be implemented by a WTRU 102, using two or more channels, for example of one or more of unlicensed frequency bands. At block 2410, the WTRU 102 may determine whether the two or more channels are available for a possible transmission. At block 2420, on condition that a plurality of the two or more channels are available for a possible transmission, the WTRU 102 may initiate multiple LBT attempts to transmit control information on one of or a subset of the available channels. At block 2430, the WTRU 102 may receive from a network entity, a response to the control information transmitted from the WTRU 102 on any of the available channels.

In certain representative embodiments, the two or more channels may be any of: (1) one or more frequency bands, (2) one or more component carriers, (3) one or more bandwidth parts, (4) one or more cells, (5) one or more sub-bands, (6) one or more LBT bandwidths, (7) physical layer characteristics, and/or (8) time/frequency resources.

In certain representative embodiments, the transmitting of the control information on the available channel or channels may include transmitting a random access preamble or a Random Access (RA) message (Msg3) on the available channel or channels.

In certain representative embodiments, the receiving of the response to the control information on any of the available channels may include receiving, a RA Response (RAR) on any of the available channels.

In certain representative embodiments, after receiving the RAR, the WTRU 102 may determine whether any of: the two or more channels are available for transmission by the WTRU. For example, on condition that a plurality of the two or more channels are available for transmission by the WTRU, the WTRU may transmit a further message over or on the available channels.

In certain representative embodiments, the two or more channels may be any of: (1) one or more bandwidth parts, or (2) one or more sub-bands.

In certain representative embodiments, the initiation of multiple LBT attempts to transmit the RA preamble on the available channels may be further conditioned on any of: (1)

a preamble retransmission number; (2) a Radio Resource Control (RRC) configuration; (3) a preamble attempt number; (4) indices of uplink (UL) and downlink (DL) bandwidth parts; (5) a linkage between or among the UL and DL bandwidth parts; (6) whether a bandwidth part inactivity timer is running; (7) observed channel occupancy or (8) load conditions on the sub-bands and/or the bandwidth parts; (9) one or more particular configurations received via signaling; and/or (10) a capability of the WTRU 102 to support multiple active bandwidth parts.

FIG. 25 is a flow chart illustrating a yet further representative procedure using a channel.

Referring to FIG. 25, the representative procedure 2500 may be implemented by a WTRU 102, using a channel, for example of one or more of unlicensed frequency bands. At block 2510, the WTRU 102 may determine that an LBT operation is successful such that the channel is available for transmission. At block 2520, the WTRU 102 may. transmit a Random Access (RA) preamble using the channel. At block 2530, the WTRU 102 may start a timer associated with an RA window to monitor for reception of an RA Response (RAR) to the transmitted RA preamble. At block 2540, the WTRU 102 may. monitor for reception of the RAR during the RA window.

In certain representative embodiments, the WTRU 102 may determine whether to extend, pause or reset an expiry time of the timer based on: any of: (1) whether the RAR is to be received on the channel; (2) that the channel is busy or (3) that a network entity (e.g., a gNB 180) did not acquire the channel, as a determined result. For example, the WTRU may extend, pause, or reset the timer in accordance with the determined result and/or may retransmit the RA preamble on condition that the timer expires prior to reception of the RAR.

In certain representative embodiments, the RA preamble may be transmitted and the RAR received on different resources, each using a different LBT operation.

FIG. 26 is a flow chart illustrating a yet additional representative procedure using a channel.

Referring to FIG. 26, the representative procedure 2600 may be implemented by a WTRU 102, using a channel, for example of one or more of unlicensed frequency bands. At block 2610, the WTRU 102 may determine whether the channel is available for a first transmission. At block 2620, on condition that the channel is available for the first transmission: the WTRU 102 may. generate a first Scheduling Request (SR) for an SR operation, and may transmit the first SR to a network entity. At block 2630, the WTRU 102 may initiate a SR prohibit timer to prohibit a further SR operation until an expiry of a first time period. At block 2640, the WTRU 102 may determine whether the channel or a further channel is available for a further transmission using an LBT operation. At block 2640, the WTRU 102 may adjust the expiry of the SR prohibit timer in accordance with an outcome of the LBT operation prior to expiry of the SR prohibit timer. For example, the time period associated with expiry of the SR prohibit timer may be adjusted to reduce or to lengthen the expiry period.

FIG. 27 is a flow chart illustrating a still further representative procedure using a channel.

Referring to FIG. 27, the representative procedure 2700 may be implemented by a WTRU 102, using a channel, for example of one or more of unlicensed frequency bands. At block 2710, the WTRU 102 may determine whether the channel is available for transmission. At block 2720, on condition that the channel is available for transmission, the WTRU 102 may generate a first Scheduling Request (SR) for an SR operation, and transmit the first SR to a network entity (e.g., the gNB 180, or another network entity). At block 2730, the WTRU 102 may initiate a prohibit timer to prohibit a further SR operation until an expiry of a first time period. At block 2740, after the transmission of the first SR, the WTRU 102 may. Determine whether the channel or a further channel used to receive a Response to the first SR is available by the network entity for transmission. At block 2750, on condition that the channel or the further channel is not available by the network entity for transmission, the WTRU 102 may extend an expiry of the prohibit timer to wait a further time period for the Response to the first SR.

In certain representative embodiments, the WTRU 102 may receive from the network entity an uplink grant prior to expiry of the further time period, and after reception of the uplink grant, may determine whether the channel is available for transmission on the provided uplink grant. For example, on condition that the channel is available for transmission, the WTRU 102 may transmit Buffer Status Report (BSR) information on the channel. A higher layer of the WTRU 102 may cancel the first pending SR and the BSR on condition that (1) the BSR information is transmitted by a physical layer (as a lower layer), and (2) an indication from the physical layer that an LBT operation was successful for the channel transmission.

In certain representative embodiments, on condition that the prohibit timer expires after either the first time period or the further time period and prior to receiving the Response to the first SR, the WTRU 102 may initiate a further SR operation by: determining whether the channel or another channel is available for transmission. On condition that the channel or other channel is available for transmission, the WTRU 102 may: (1) generate a further SR for the further SR operation, and may transmit the further SR to the network entity. The WTRU 102 may initiate a prohibit timer to prohibit an additional SR operation until an expiry of another time period, The WTRU 102 may receive from the network entity, an uplink grant prior to expiry of the other time period. After reception of the uplink grant, the WTRU 102 may determine whether the channel or the other channel is available for transmission on the provided uplink grant. On condition that the channel or the other channel is unavailable for transmission, the WTRU 102 may: extend the expiry of the prohibit timer to wait a further time period for reception of a further uplink grant from the network entity. The WTRU may monitor for reception of the further uplink grant prior to the expiry of the further time period.

FIG. 28 is a flow chart illustrating a still additional representative procedure using a channel.

Referring to FIG. 28, the representative procedure 2800 may be implemented by a WTRU 102, using a channel, for example of one or more of unlicensed frequency bands. At block 2810, the WTRU 102 may determine, from signaling sent by a network entity, (1) that a Channel Occupancy Time (COT) sharing operation is being performed on the channel acquired by the network entity and (2) one or more switching points at which the WTRU is to transmit on the channel acquired by the network entity. At block 2820, the WTRU 102 may. determine a type of LBT configuration to be performed based on the COT sharing operation and a current switching point of the one or more determined switching points. At block 2830, in accordance with the type of LBT configuration selected, the WTRU 102 may determine whether the channel is available for transmission. At block 2840, the WTRU 102 may transmit data or control information on the channel at the current switching point, on condition that the channel is available for transmission.

In certain representative embodiments, the type of LBT configuration selected may indicate that one of: (1) a shortened LBT operation is to be performed; or (3) no LBT operation is to be performed. For example, the type of LBT configuration selected may indicate a shortening LBT operation; and the transmitting of data or control information on the channel at the switching point may include transmitting a Random Access (RA) message on the channel at the current switching point (e.g., after the shortened LBT operation has been completed).

In certain representative embodiments, the WTRU 102 may transmit data on the channel acquired by the network entity after transmitting the RA message.

Systems and methods for processing data according to representative embodiments may be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within a robotic assistance/apparatus (RAA) and/or another mobile device remotely. In the later a case, data may be transferred via wireline or wirelessly between the RAA or other mobile device containing the sensors and the remote device containing the processor which runs the software which performs the scale estimation and compensation as described above. According to other representative embodiments, some of the processing described above with respect to localization may be performed in the device containing the sensors/cameras, while the remainder of the processing may be performed in a second device after receipt of the partially processed data from the device containing the sensors/cameras.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, User Equipment, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM") or non-volatile (e.g., Read-Only Memory ("ROM") mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc."

is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM") or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method implemented by a Wireless Transmit/Receive Unit (WTRU) using an unlicensed frequency channel, the method comprising:
   determining that a first preamble is to be transmitted;
   determining one or more first physical random access channel (PRACH) resources to transmit the first preamble;
   monitoring for a first downlink (DL) signal within a first Channel Occupancy Time (COT), wherein the monitoring for the first DL signal is based on a configured pattern, and wherein reception of the first DL signal is an indication that the WTRU can transmit the first preamble; and
   on condition that the first DL signal within the first COT is received:
      determining, based on a duration of a time gap after reception of the first DL signal within the first COT, that a listen before talk (LBT) operation is not required, and
      transmitting the first preamble in the one or more first PRACH resources;
   determining that a second preamble is to be transmitted;
   determining one or more second PRACH resources to transmit the second preamble;
   monitoring for a second downlink (DL) signal within a second Channel Occupancy Time (COT), wherein the monitoring for the second DL signal is based on the configured pattern, and wherein reception of the second DL signal is an indication that the WTRU can transmit the second preamble; and
   on condition that the second DL signal within the second COT is received:
      determining, based on a duration of a time gap after reception of the second DL signal within the second COT, to perform a listen before talk (LBT) operation, and
      on condition that a channel associated with the one or more second PRACH resources is determined to be idle in accordance with the LBT operation, transmitting the second preamble in the one or more second PRACH resources.

2. The method of claim 1, wherein any of the first DL signal and the second DL signal are carried by any of: (1) Physical Downlink Control Channel (PDCCH), (2) a Synchronization Signal Block (SSB), (3) a Master Information Block (MIB), and (4) a System Information Block (SIB).

3. The method of claim 1, further comprising selecting a type of the LBT operation from among: (1) a first LBT type in which a short LBT operation is performed; and (2) a second LBT type in which a full LBT operation is performed.

4. The method of claim 1, wherein the LBT operation comprises a short LBT operation, the method further comprising:
   performing the short LBT operation;
   determining, based on the short LBT operation, that the channel is not idle;
   waiting a time period to transmit the second preamble on condition that the short LBT operation is performed and a channel associated with the one or more second PRACH resources is determined to not be idle in accordance with the short LBT operation;
   performing a further LBT operation after waiting the time period, wherein the further LBT operation is one of a further short LBT operation or a full LBT operation, and
   transmitting the second preamble in one or more configured PRACH resources, on condition that the channel associated with the one or more second PRACH resources is determined to be idle in accordance with the further LBT operation.

5. The method of claim 4, wherein the performing the short LBT operation includes:
   monitoring for a signal over the channel associated with the one or more second PRACH resources; and
   determining whether the channel is idle in accordance with the monitored for signal being received.

6. A Wireless Transmit/Receive Unit (WTRU), comprising:
   circuitry, including any of a processor and transceiver, configured to
   determine that a first preamble is to be transmitted;
   determine one or more first physical random access channel (PRACH) resources to transmit the first preamble;
   monitor, based on a configured pattern, for a first downlink (DL) signal within a first Channel Occupancy Time (COT), wherein reception of the first DL signal is an indication that the WTRU can transmit the first preamble;
      on condition that the first DL signal within the first COT is received, determine, based on a duration of a time gap after reception of the first DL signal within the first COT, that a listen before talk (LBT) operation is not required; and transmit the first preamble in the one or more first PRACH resources;

determine that a second preamble is to be transmitted;

determine one or more second physical random access channel (PRACH) resources to transmit the second preamble;

monitor, based on the configured pattern, for a second downlink (DL) signal within a second Channel Occupancy Time (COT), wherein reception of the second DL signal is an indication that the WTRU can transmit the second preamble;

on condition that the second DL signal within the second COT is received, determine, based on a duration of a time gap after reception of the second DL signal within the second COT, to perform a listen before talk (LBT) operation; and on condition that a channel associated with the one or more second PRACH resources is determined to be idle in accordance with the LBT operation, transmit the second preamble in the one or more second PRACH resources.

7. The WTRU of claim 6, wherein any of the first DL signal and the second DL signal are carried by any of: (1) Physical Downlink Control Channel (PDCCH), (2) a Synchronization Signal Block (SSB), (3) a Master Information Block (MIB), and (4) a System Information Block (SIB).

8. The WTRU of claim 6, wherein the processor is configured to select a type of LBT operation from among: (1) a first LBT type in which a short LBT operation is performed; and (2) a second LBT type in which a full LBT operation is performed.

9. The WTRU of claim 6, wherein the LBT operation comprises a short LBT operation, and the processor, in communication with the transceiver, are configured to:

perform the short LBT operation;

determine, based on the short LBT operation, that the channel is not idle;

wait a time period to transmit the second preamble on condition that the short LBT operation is performed and a channel associated with the one or more second PRACH resources is determined to not be idle in accordance with the short LBT operation;

perform a further LBT operation after waiting the time period, wherein the further LBT operation is one of a further short LBT operation or a full LBT operation, and transmit the second preamble in one or more configured PRACH resources, on condition that the channel associated with the one or more second PRACH resources is determined to be idle in accordance with the further LBT operation.

10. The WTRU of claim 9, wherein, to perform the short LBT operation, the processor, in communication with the transceiver, are configured to:

monitor for a signal over the channel associated with the one or more second PRACH resources; and determine whether the channel is idle in accordance with the monitored for signal being received.

\* \* \* \* \*